US008711903B2

(12) United States Patent
Rheinfelder et al.

(10) Patent No.: US 8,711,903 B2
(45) Date of Patent: Apr. 29, 2014

(54) ANTENNA ARRAY SYSTEM

(75) Inventors: Clemens Rheinfelder, Blaustein (DE);
Werner Korte, Eschwege (DE);
**Ingeborg Sigrid Ilse-Dore
Korte-Gericke**, legal representative,
Eschwege (DE)

(73) Assignee: Kathrein-Werke KG, Rosenheim (DE)

( * ) Notice: Subject to any disclaimer, the term of this patent is extended or adjusted under 35 U.S.C. 154(b) by 585 days.

(21) Appl. No.: 12/339,239

(22) Filed: Dec. 19, 2008

(65) Prior Publication Data

US 2009/0252205 A1    Oct. 8, 2009

Related U.S. Application Data

(63) Continuation-in-part of application No. PCT/EP2007/006334, filed on Jul. 17, 2007.

(60) Provisional application No. 60/807,509, filed on Jul. 17, 2006.

(30) Foreign Application Priority Data

Jul. 17, 2006    (GB) .................................. 0614299.6

(51) Int. Cl.
*H04B 1/38* (2006.01)

(52) U.S. Cl.
USPC ........... 375/219; 375/220; 375/222; 455/522; 455/69

(58) Field of Classification Search
USPC ........................................................ 375/219
See application file for complete search history.

(56) References Cited

U.S. PATENT DOCUMENTS

| 4,852,094 | A | * | 7/1989 | Wang ............................ 714/735 |
| 5,642,405 | A | | 6/1997 | Fischer et al. |
| 5,657,374 | A | | 8/1997 | Russell et al. |
| 5,812,522 | A | * | 9/1998 | Lee et al. ...................... 370/206 |

(Continued)

FOREIGN PATENT DOCUMENTS

| EP | 924864 | 6/1999 |
| EP | 1143554 | 10/2001 |

(Continued)

OTHER PUBLICATIONS

Examination Report dated Jul. 14, 2010 issued in GB Appl. No. 0614299.6.

(Continued)

*Primary Examiner* — Lihong Yu
(74) *Attorney, Agent, or Firm* — Stephen H. Eland; Dann, Dorfman, Herrell & Skillman

(57) ABSTRACT

Antenna system connectable to a base station, the antenna system comprising a digital radio unit connectable to at least one antenna element, wherein the digital radio unit comprises: at least one micro radio for receiving/sending digital radio signals having a digital down-converter/a digital up-converter and a digital signal converter. The at least one micro radio converts the digital radio signals to analogue RF (radio frequency) signals and vice versa. The at least one micro radio has at least one hub for processing digital radio signals and control signals and for routing said digital radio signals and control signals via at least one serial link and at least one interface. The at least one serial link is provided between the at least one hub and the at least one micro radio.

30 Claims, 16 Drawing Sheets

(56) References Cited

U.S. PATENT DOCUMENTS

| | | | |
|---|---|---|---|
| 5,818,883 A | 10/1998 | Smith et al. | |
| 5,909,471 A | 6/1999 | Yun | |
| 6,160,506 A * | 12/2000 | Pellon | 341/143 |
| 6,167,099 A | 12/2000 | Rader et al. | |
| 6,219,347 B1 * | 4/2001 | Uchida et al. | 370/347 |
| 6,243,430 B1 | 6/2001 | Mathe | |
| 6,349,217 B1 | 2/2002 | Honcharenko et al. | |
| 6,463,295 B1 * | 10/2002 | Yun | 455/522 |
| 6,518,904 B1 * | 2/2003 | Jelonnek | 341/143 |
| 6,594,773 B1 * | 7/2003 | Lisitsa et al. | 713/600 |
| 6,785,558 B1 * | 8/2004 | Stratford et al. | 455/561 |
| 6,801,788 B1 | 10/2004 | Csapo et al. | |
| 6,854,015 B2 | 2/2005 | McCormack et al. | |
| 7,328,033 B2 | 2/2008 | Rappaport et al. | |
| 7,405,685 B2 * | 7/2008 | Rezeq et al. | 341/143 |
| 7,474,712 B1 * | 1/2009 | Keating | 375/324 |
| 7,480,689 B2 * | 1/2009 | Song | 708/300 |
| 2002/0147978 A1 * | 10/2002 | Dolgonos et al. | 725/62 |
| 2004/0017306 A1 * | 1/2004 | Miao | 341/155 |
| 2004/0142728 A1 * | 7/2004 | Tari et al. | 455/561 |
| 2004/0198451 A1 | 10/2004 | Varghese | |
| 2004/0219950 A1 | 11/2004 | Pallonen et al. | |
| 2005/0113120 A1 * | 5/2005 | Rappaport et al. | 455/500 |
| 2007/0057845 A1 | 3/2007 | Miura | |
| 2009/0252205 A1 | 10/2009 | Rheinfelder et al. | |

FOREIGN PATENT DOCUMENTS

| | | |
|---|---|---|
| GB | 2354674 | 3/2001 |
| GB | 2393580 | 3/2004 |
| JP | 10-502513 | 3/1998 |
| JP | 2000041277 | 2/2000 |
| JP | 2000068839 | 3/2000 |
| JP | 2001512953 | 8/2001 |
| JP | 2001515691 | 9/2001 |
| JP | 2001358744 | 12/2001 |
| JP | 2002501319 | 1/2002 |
| JP | 2004523942 | 8/2004 |
| JP | 2005136880 | 5/2005 |
| WO | 96/29834 | 9/1996 |
| WO | 99/37047 | 7/1999 |
| WO | 02/47411 | 6/2002 |
| WO | 2005/120001 | 12/2005 |
| WO | 2008/009421 | 1/2009 |

OTHER PUBLICATIONS

Official Action for JP 2009-519864 issued on Jan. 24, 2012.
Japanese Official Action issued in 2009-519864 on Feb. 5, 2013.
Japanese Official Action issued in 2009-519864 on Oct. 22, 2013.

* cited by examiner

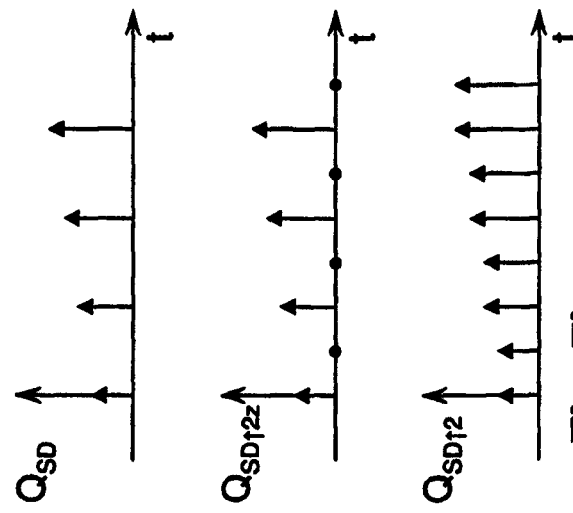
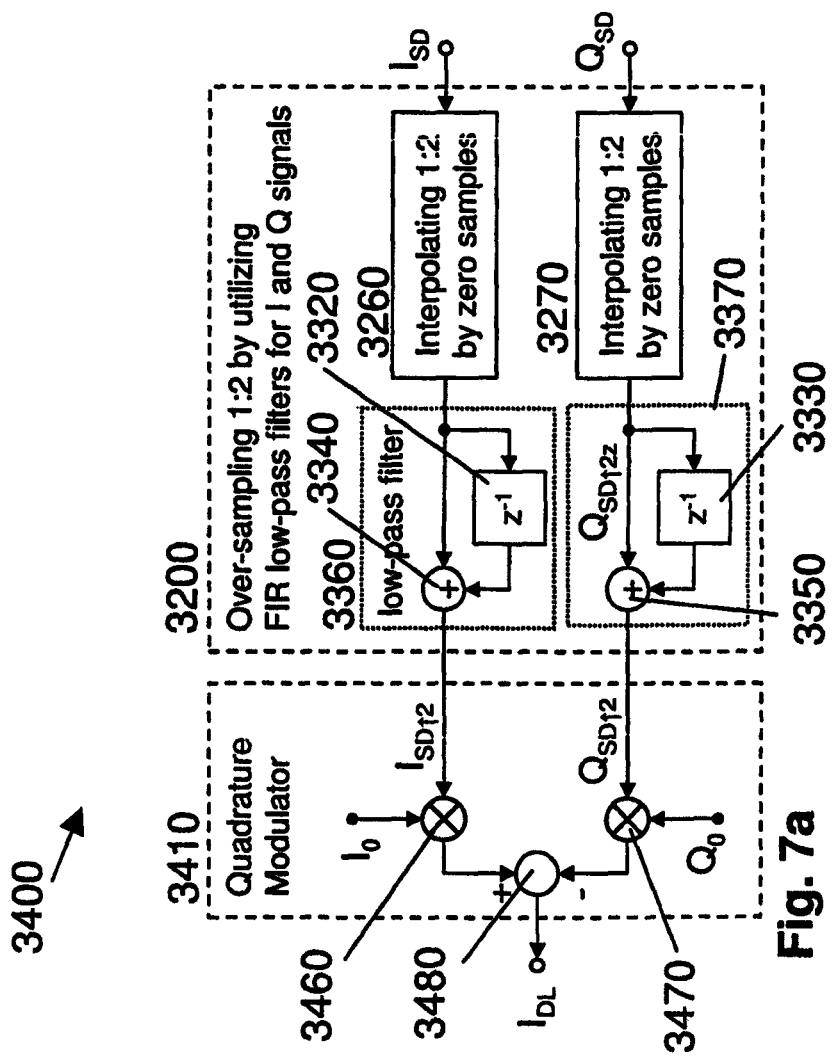
Fig. 7a
Fig. 7b

ANTENNA ARRAY SYSTEM

RELATED APPLICATIONS

This application is a continuation-in-part of International Patent Application No. PCT/EP2007/006334, filed 17 Jul. 2007, which claims priority of U.S. provisional application 60/807,509, filed 17 Jul. 2006, and of UK patent application GB 0614299.6, filed 17 Jul. 2006. The entire disclosure of each of the foregoing application is incorporated herein by reference.

FIELD OF THE INVENTION

The present application relates to radio transceivers and antenna systems. In particular, the present invention relates to base transceiver stations and antennas for mobile communication systems.

BACKGROUND

Mobile communication technology has greatly advanced in recent years, as evident by the high performance digital mobile phones currently available. Mobile communication has been made available with almost 100% coverage area in many regions of the world following the demand of the users. Users wish to be able to communicate via their mobile phone (mobile stations) from anywhere they are.

As a consequence, the number of mobile stations and the number of communications links established is increasing. In addition, the amount of data transferred over a communication link is steadily increasing as it is not only desired to transfer voice messages or short messages with high quality but also increasing amounts of data, i.e. for images, movies or music etc.

In order to be reachable, a base transceiver station (BTS) has to be within the range of the mobile station. A communications link is then established between the mobile station and the BTS in which communications data are sent and received from the mobile stations and the BTS by an RF signal. The BTS transfers the communications data further into telephony or other communication networks.

Mobile service providers have to ensure that their clients can have access to a BTS almost everywhere they are. Therefore BTSs have to be distributed in order to achieve a high coverage area. In addition, a sufficient number of BTS has to be installed in urban areas in which large numbers of mobile communication have to be performed concurrently.

Modern BTS have to cover a wide frequency bandwidth and a high dynamic range.

In order to provide good access, antennas of BTS are usually placed in exposed places such as roof tops, tower tops or on masts, so that they are not shielded by walls or the landscape itself and the area covered can be maximized.

DESCRIPTION OF THE RELATED ART

Base transceiver stations (BTS) known in the art usually comprise tower-top equipment and a base station.

The tower-top equipment mainly consists of a plurality of antenna elements forming an antenna that is mounted on exposed places such as roof tops, masts or the like, whereto and from which the RF signal can be transmitted to the mobile station with as few barriers as possible. When mounted exposed, antennas can also be widely seen. This, however, is not always wanted and frequently raises concerns with residents living close to the antennas.

The antennas of the tower-top equipment known in the prior art are connected to radio units for transceiving the RF signals via the antenna elements of the antenna. The radio units serve as converters of RF signals into a digital base-band signal and are usually located together with further electronic equipment necessary for the BTS in a base station. At present the base station requires a considerable amount of space, usually of the size of a small room. This room or container may be located in the basement or on the roof of the building on which the antenna is mounted. The base station and the radio unit are at some distance from the antenna, thus requiring a connection between them.

The radio unit and the antenna elements are connected with coaxial cables in order to shield them from electrical noise as far as possible. These coaxial cables are at present about 10-50 m in length because of the distance between the antenna and the radio unit. The cable length has the inherent disadvantages of energy and signal to noise loss. The coaxial cable often runs along the outside of the building and is as a result unsightly.

The United Kingdom Patent Application GB 2 393 580 A describes an active antenna array with linear power amplifiers coupled proximate to the antenna elements. The connection between the base station and the radio unit is digital. The up-conversion and the down-conversion between the base-band and the carrier-band is performed in the analogue domain. The amplification of the up-link signals and down-link signals is carried out by analogue components, such as a linear power amplifier or a low noise amplifier. The entire disclosure of GB 2 393 580 A is hereby incorporated into the description by reference.

The European Patent Application EP 0 924 864 A3 relates to an automotive digital radio system that supports integration of cell phone functionality into the automotive digital radio. As such, the cell phone portion of the radio system corresponds to a mobile station (MS) in a mobile communications system. The radio system is digital because distributed components (AM/FM antenna, cellular antenna, loudspeaker, microphones etc) are connected to a digital radio signal processor via digital connections. However, within the distributed components signal processing is performed in an analogue manner. For example the antenna module located at the antenna processes much of tuning functions in analogue and then converts the signal to digital and sends it to the digital radio signal processor. The entire disclosure of EP 0 924 864 A3 is hereby incorporated into the description by reference.

The United States Patent Application Publication US 2004/0198451 describes an intermediate frequency (IF) fibre optic communications link that communicates receive signals and transmit signals between a distributed active antenna and base station electronics in an antenna installation. Within the so-called tower top antenna structure the only digital signal processing relates to the communications link to the base station. Further signal processing, in particular up-conversion/down-conversion and amplification is performed on analogue signals. The entire disclosure of US 2004/0198451 is hereby incorporated into the description by reference.

U.S. Pat. No. 5,657,374 describes a remote antenna unit including a multiplexer/demultiplexer unit, digital-to-analogue and analogue-to-digital conversion units, amplifiers, band pass filters, and antenna elements. The remote antenna unit described in U.S. Pat. No. 6,657,374 does not include a digital down-converter or a digital up-converter. The entire disclosure of U.S. Pat. No. 5,657,374 is hereby incorporated into the description by reference.

Therefore, a system is required that minimizes or avoids the electrical losses of the RF signal and makes use of the advantages of extensive digital signal processing.

There is also a need for a BTS that requires less space and that is easier to install and maintain.

SUMMARY OF THE INVENTION

It is therefore an object of the teachings disclosed herein to provide a base transceiver station that avoids the use of coaxial cables for transferring a signal.

It is another object of the teachings disclosed herein to provide a base transceiver station with low space requirements.

It is furthermore an object of the teachings disclosed herein to provide a base transceiver station with low power electronics.

It is further an object of the teachings disclosed herein to provide a digital radio unit that can be installed at the tower top equipment of a BTS in close proximity of the antenna.

It is yet a further object of the teachings disclosed herein to provide a digital radio-unit for an all-digital antenna.

These and other objects of the teachings disclosed herein are solved by an antenna system connectable to a base station. The antenna system comprises a digital radio unit connectable to at least one antenna element, wherein the digital radio unit comprises: at least one micro radio for receiving and/or sending digital radio signals having a digital down-converter and/or a digital up-converter and a digital signal converter, whereby the at least one micro radio converts the digital radio signals to analogue RF (radio frequency) signals and vice versa; at least one hub for processing digital radio signals and control signals and for routing said digital radio signals and control signals via at least one digital link and at least one interface, the at least one digital link (260) being provided between the at least one hub and the at least one micro radio (230).

The radio communications stationary transmission/receiving apparatus can be used in mobile communications networks but can also be used in other communication networks.

The radio communications transmission/receiving apparatus can be stationary. A stationary apparatus is in this respect an apparatus that is used as a base station or as antenna for a base station to enable the communication with e.g. mobile communications devices. The term stationary apparatus also includes, but is not limited to, radio communications transmission/receiving apparatus that can be moved from one place to another, such as base stations that are mounted on a vehicle to be placed in areas with temporarily high access request, e.g. of events or the like.

The digital radio unit may be connected proximately to the at least one antenna element. It should be understood that the term "proximate" means that the digital radio unit and the at least one antenna element are closely located to each other. This avoids the use of long coaxial cables which would otherwise be necessary and are known in the art. The antenna element and the digital radio unit may be mounted on a single circuit board or the antenna element may be directly connected to the digital radio unit. One or more of the antenna elements may be connected to a single digital radio unit.

The digital radio signals can be digital base-band signals, digital band-pass signals or the like that can be modulated.

In a preferred embodiment, the at least one micro radio is operable in FDD mode and comprises: a FDD filter unit connected at a receive output to an input of a low noise analogue-to-digital converter (ADC) and further connected at a transmit input to an output of a power digital-to-analogue converter (PDAC); a digital transceiver (DTRX) connected at an output for signal ($I_{DL}$) to an input of the PDAC and further connected at an input for signal ($R_S$) to an output of the ADC, the digital transceiver DTRX having a receive section and a transmit section, the digital up-converter being part of the transmit section and the digital down-converter being part of the receive section; a receive clock oscillator unit (RCLK) for providing a sampling clock for the ADC and for the receive section of the DTRX and for further providing a sub-sampling pulse for said receive section; a transmit clock oscillator unit (TCLK) for providing a sampling clock for the PDAC and for the transmit section of the DTRX.

In an alternative preferred embodiment, the at least one micro radio is operable in the TDD mode and comprises: a TDD filter unit followed by a TDD switch connected at a receive output to an input of a low noise analogue-to-digital converter (ADC) and further connected at a transmit input to an output of a power digital-to-analogue converter (PDAC); a digital transceiver (DTRX) connected at an output for signal ($I_{DL}$) to an input of the PDAC and further connected at an input for signal ($R_S$) to an output of the ADC, the DTRX having a receive section and a transmit section, the digital up-converter being part of the transmit section and the digital down-converter being part of the receive section; at least one clock oscillator unit (TRCLK) for providing a sampling clock for the ADC, the PDAC and the DTRX and for further providing a sub-sampling pulse for the receive section of the DTRX and a time control signal for the TDD switch.

The at least one clock oscillator unit may be a single transceiver clock oscillator unit. Alternatively, a plurality of clock oscillators may each provide sampling pulses to components of the digital radio unit.

In one embodiment, the analogue-to-digital converter (ADC) is a low noise analogue-to-digital converter. The (ADC) can comprises a low noise amplifier followed by a continuous-time sigma-delta band-pass modulator converting the RF signal at the input directly into a single/1.5 bit band-pass output signal ($R_S$).

In further embodiments of the antenna system as described above the power digital-to-analogue converter (PDAC) utilizes 2 or 3 voltage levels to convert a single/1.5 bit band-pass input signal ($I_{DL}$) directly into a RF output signal.

In a further preferred embodiment, the micro radio is monolithically integrated by micro-electronic means or as a multi-chip module.

The digital radio unit comprising the at least one micro radio and the at least one hub may also be integrated by micro-electronic means or as a multi-chip module.

In a further embodiment of the teachings disclosed herein, one digital radio unit is provided for each antenna element.

The teachings of this application are also directed to a computer-program product embodied on a computer-readable medium and comprising executable instructions for the manufacture of the antenna system.

These and other aspects of the disclosed antenna system or computer-program product will be apparent from and elucidated with reference to the embodiment(s) described herein after.

BRIEF DESCRIPTION OF THE DRAWINGS

The features of the teachings disclosed herein may be better understood when reading the detailed description and the figures, wherein identical numbers identify identical or similar objects.

FIG. 4b shows an example of the data frame format used between the μ-radio and the C-Hub in FIG. 4a.

FIG. 7a shows the block diagram of a generic digital quadrature modulator with 1:2 over-sampling pre-stage having the identical functionality as the quadrature modulation by multiplexing and cyclic negation block of the DUC of FIG. 5.

FIG. 7b shows illustrative examples of signals of the generic digital quadrature modulator with 1:2 over-sampling pre-stage of FIG. 7a.

FIGS. 8a-8i show examples of signals at different lines of the digital quadrature modulator in in-phase version shown in FIG. 7a.

DETAILED DESCRIPTION

It should be appreciated that the various aspects of what is taught herein are merely illustrative of the specific ways to make and use the taught antenna array system and do not limit the scope of what is claimed herein when taken into consideration with the claims and the following detailed description and the accompanying Figures. It should be observed that features from one aspect of what is taught herein can be combined with features from other aspects of the teachings disclosed herein.

Figure 1:
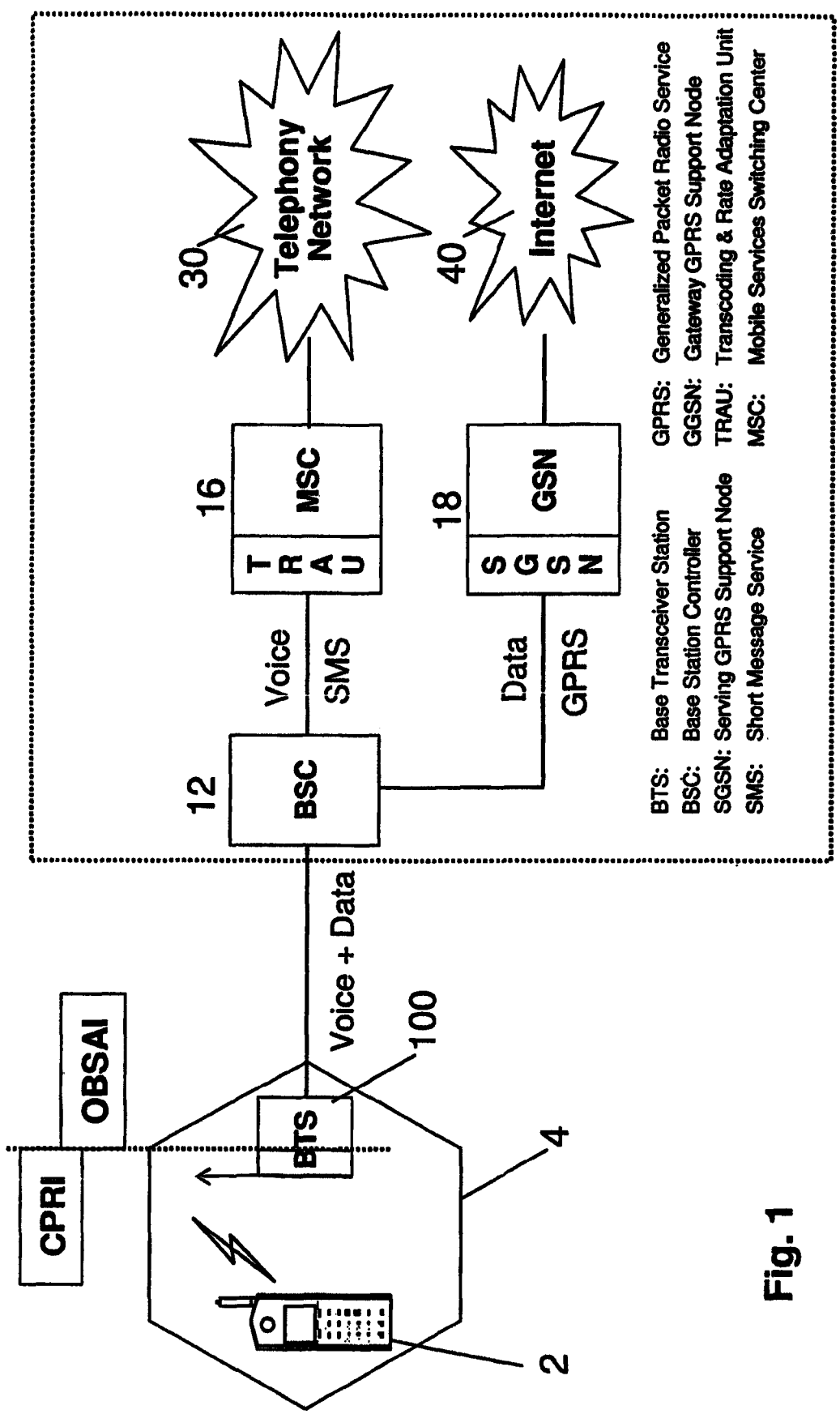
FIG. 1 shows a mobile communications network

FIG. 1 shows an overview of a mobile communications network. A mobile station 2 can communicate via radio links with a base transceiver station (BTS) 100 when the mobile station 2 is within the range 4 of the BTS 100. A mobile station 2 is any mobile or immobile communication device that enables communication via radio links, usually at radio frequencies (RF) in the range of 800 MHz up to several GHz. Common examples for mobile stations are, but are not limited to, mobile telephones, pocket PC, data cards etc.

If a mobile station 2 is in the range of the BTS 100 data communication may be established between the mobile station 2 and the BTS 100. The data communication may be used to transfer voice and/or data. During communication the BTS 100 sends RF signals that are received by the mobile station 2 via a radio downlink and receives RF signals sent by the mobile station 2 via a radio uplink. In the Frequency Division Duplex (FDD) mode two different frequency bands are utilized to separate the radio downlink from the radio uplink. In the Time Division Duplex (TDD) mode, however, only one frequency band is used in both directions downlink and uplink. The separation is performed in the time domain by using the same frequency band alternately in downlink and uplink direction. Thus, in TDD mode the antenna plus band-pass filter is periodically switched either to the transmit path or to the receive path. Both modes are utilized in different mobile radio standards, although FDD is more widespread than TDD.

From the BTS 100, data (which includes data communication data and voice data) are transferred to a base station controller 12. The base station controller (BSC) 12 separates voice data and data communication data and sends the voice data and the SMS data to a mobile switching centre (MSC) 16 from which the voice data and the SMS data are further transferred to a telephony network 30 to which the MSC 16 is linked. Other data are sent by the BSC 12 to a Serving and Gateway GPRS Support Node (GSN) 18 and are further transferred to a data network 40, such as the Internet. It is understood that all communications flow may be in both directions. Data are also sent from the data network 40 and/or the telephony network 30 in the opposite direction to the BTS 100 from which the data are sent by radio waves as RF signal to the mobile station 2. Several mobile stations 2 may be communicating with a single BTS 12 at the same time.

Figure 2:
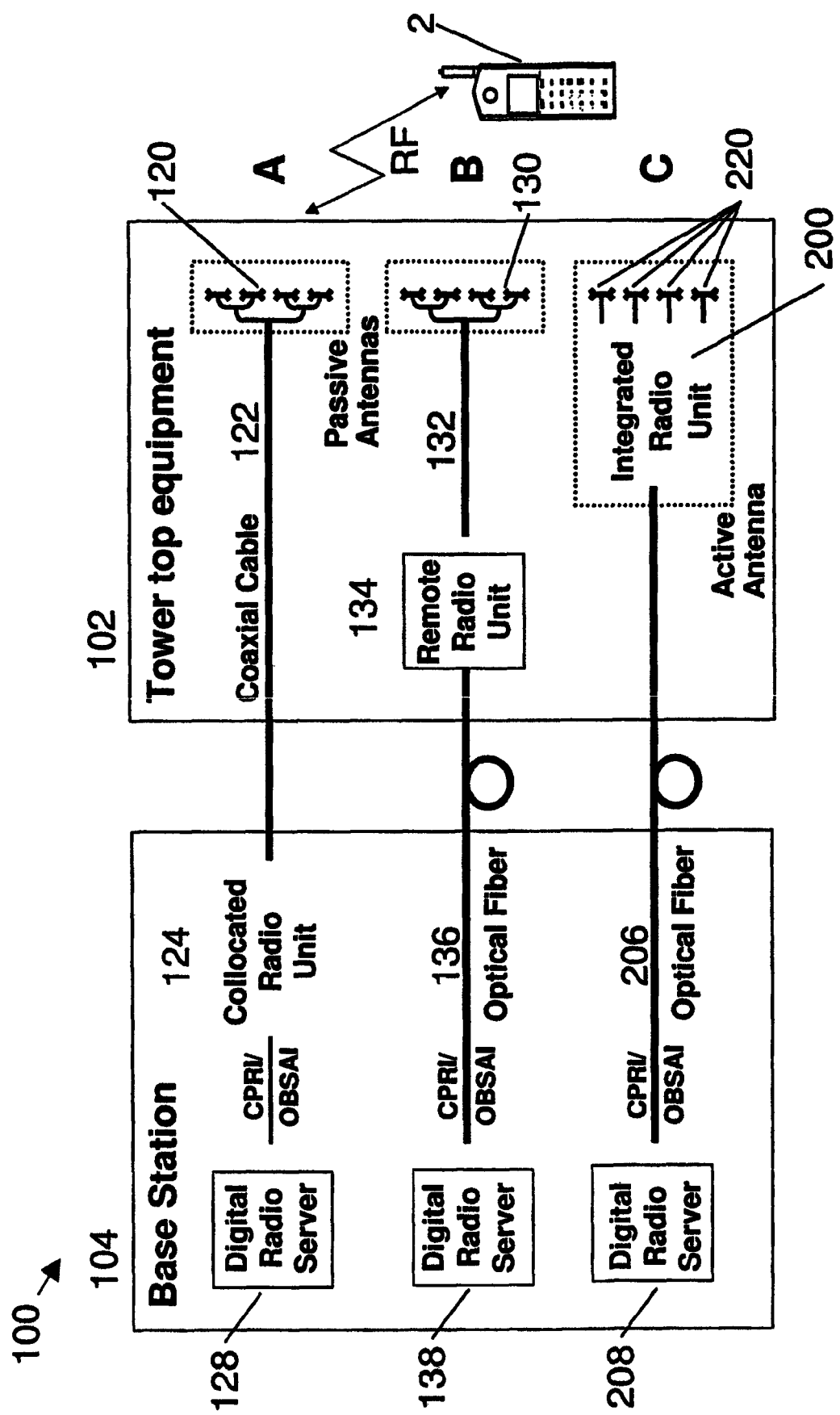
FIG. 2 shows base station configurations according to prior art and according to the teachings disclosed herein.

FIG. 2 shows three different configurations of base transceiver stations (BTS) 100. All BTS 100 comprise tower-top equipment 102 that is usually mounted—as discussed in the introduction—in an elevated position, such as on roof tops or towers, in order to maximize the coverage area of the BTS 100. The tower-top equipment 102 is connected to a base station 104 that may be in a specific housing beside or at some distance from the tower-top equipment.

In a first configuration (A) known in the art, a set of antennas or antenna elements 120 for receiving and sending radio signals from and to the mobile station 2 is linked with a coaxial cable 122 to a collocated radio unit 124. An analogue RF is received at the set of antennas or antenna elements 120 and passed to the collocated radio unit 124. In the collocated radio unit 124, the analogue radio RF signal is amplified, separated from a carrier frequency and converted into a digital signal. The digital signal is than further transferred to a digital radio server 128 from which the digital signal is passed on to the BSC 12 shown in FIG. 1 or vice versa. The length of the coaxial cable affects the signal-to-noise ratios and the efficiency of the BTS 100 as well as for the electrical power consumed and the configuration of electronics components necessary.

As discussed above, the tower-top equipment is in many cases located at exposed places such as tower tops, roofs or on the top of masts in order to maximize the area covered by the antennas. The length of the coaxial cable 122 may therefore become inefficiently long.

In a second configuration (B), a remote radio unit 134 is mounted at the tower top equipment 102. In that way a shorter coaxial cable 132 can be used to connect antennas or antenna elements 130 to the remote radio unit 134. The remote radio unit 134 converts modulated RF signals to communications signals in digital data format according to the CPRI or OBSAI standard. The communications signals are then transferred via optical fibres 136 to a digital radio server 138 that may be essentially identical or similar to digital radio server 128.

In configuration (A) and (B), the plurality of antenna elements form an antenna 120; 130 that is connected via one coaxial cable 122; 132 to the single radio unit 124; 134. The radio unit 124, 134 must then separate signals received from the plurality of antenna elements in order to separate different communications links handled in parallel.

In a third configuration (C) according to the teachings disclosed herein, a digital radio unit 200 is directly connected to the plurality of antenna elements 220 forming the antenna. Each one of the antenna elements 220 is thereby directly connected to the digital radio unit or its components. In this embodiment no coaxial cable is required in order to couple the digital radio unit 200 to the antenna elements 220. The digital radio unit 200 converts RF signals received and transmitted via the antenna elements 220 from/to the mobile station 2 into signals according to CPRI or OBSAI standard/interface. These signals are then transferred via optical fibres to a digital radio server 208 located at base station 104. The optical fibre may thereby be up to 40 km long enabling the remote location of the base station 104 with respect to the tower-top equipment.

With the teachings disclosed herein only the antenna elements 220 together with the digital radio unit 200 have to be installed at the location of the antenna. The base station 104 may be at some distance away. It is also possible, especially in urban areas with high antenna density, to connect several tower top equipments to a single one of the base stations 104.

The digital radio servers 128; 138; 208 may thereby be of the same type in all configurations (A) (B) and (C).

Figure 3C:
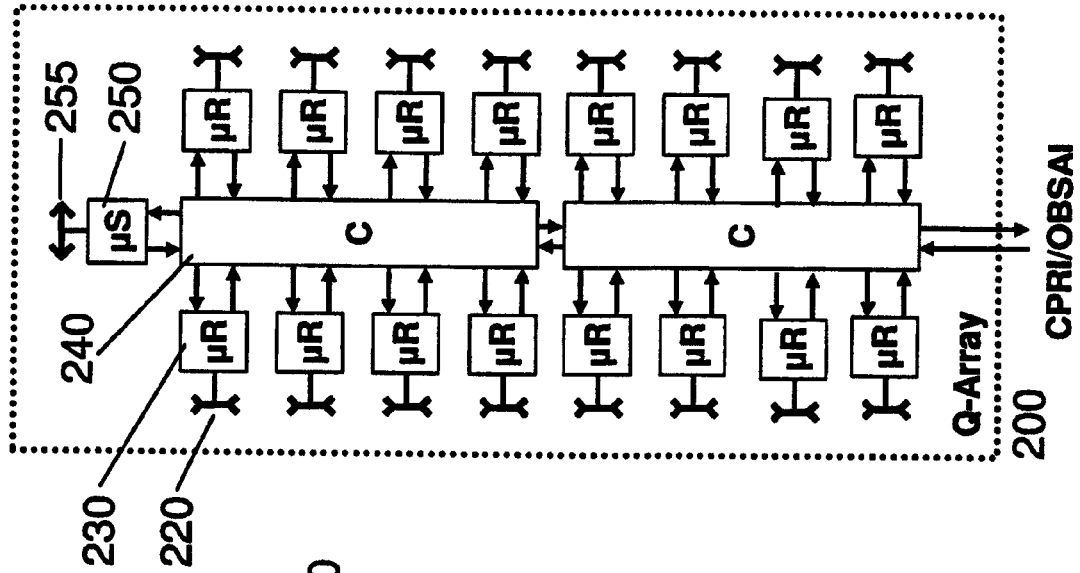
FIG. 3a to 3c shows different configurations of the all-digital antenna system according to the teachings disclosed herein.
Figure 3B:
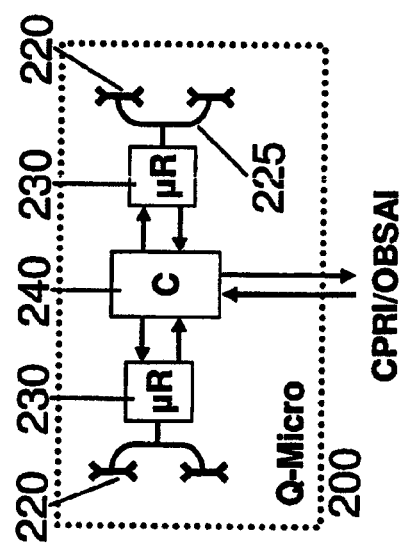
Figure 3A:
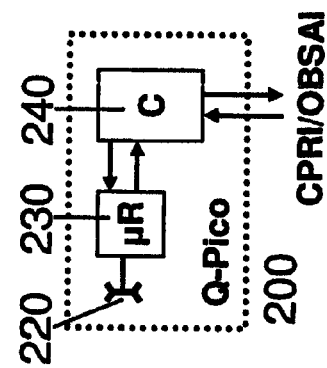

FIG. 3a to 3c show different embodiments of the digital radio units 200 according to the teachings disclosed herein. The digital radio unit 200 comprises at least one antenna element 220, at least one micro radio 230, and at least one hub 240, also referred to as "C-hub".

In the embodiment shown in FIG. 3a, the digital radio unit 200 comprises a single antenna element 220 directly connected to one micro radio 230 and one C-hub 240. The micro radio 230 communicates with the C-hub 240 in a receiving and sending direction. The bi-directional serial interface between micro radio and C-hub is based on the well known standard termed 'SerDes'. The C-hub 230 is further connected to the digital radio server 208, i.e. via an optical fibre as shown in FIG. 2.

A plurality of the embodiments of FIG. 3a may be arranged and coupled in an array.

In the embodiment shown in FIG. 3b, a C-hub 240 is connected to two micro radios 230. Each of the micro radios 230 communicates in sending and receiving direction with the C-hub 240. Further, each micro radio 230 is connected to two antenna elements 220 via a so called Wilkinson splitter 225 known in the art.

FIG. 3c shows another embodiment of the teachings disclosed herein. In this embodiment a plurality of micro radios 230 are connected to one C-hub 240 whereby each of the micro radios 230 communicate in sending and receiving direction with the C-hub 240. Sixteen micro radios 230 are shown in FIG. 3c but this is not limiting the teachings disclosed herein. In this example, each one of the micro radios 230 is connected to a antenna element 220. Several C-hubs 240 each with 8 micro radios 230 and 8 antenna elements 240 may be linked together to form arrays of 16 or more antenna elements 220.

It will be obvious to a person skilled in the art that the embodiments shown are examples only and that any number of micro radios 230 may be connected to a C-hub 240. It is also obvious to a person skilled in the art that the number of antenna elements 220 per micro radio 230 can vary according to the needs of a particular application, although it is preferred to have one or two antenna elements 220 per micro radio 230. In addition, a plurality of C-hubs 240 can be coupled together (as is shown in FIG. 3c which includes two C-hubs 240.

In addition, a so called 'micro-sniffer' (µS) 250 can be connected to one of the C-Hubs 240 for monitoring and calibrating purposes. The micro-sniffer 250 is a special micro radio having inverse receive and transmit frequency band. The micro-sniffer 250 can be connected to the C-Hub 240 via the same or a similar interface. The micro-sniffer 250 additionally has an antenna 255 that may have the form of an antenna element or another form. The micro-sniffer 250 transmits pilot signals towards and detects the radiation emitted from the antenna elements 220, thus providing the C-Hubs 240 with feedback control information as required by the micro radios 230 for calibration purposes.

Figure 4A:
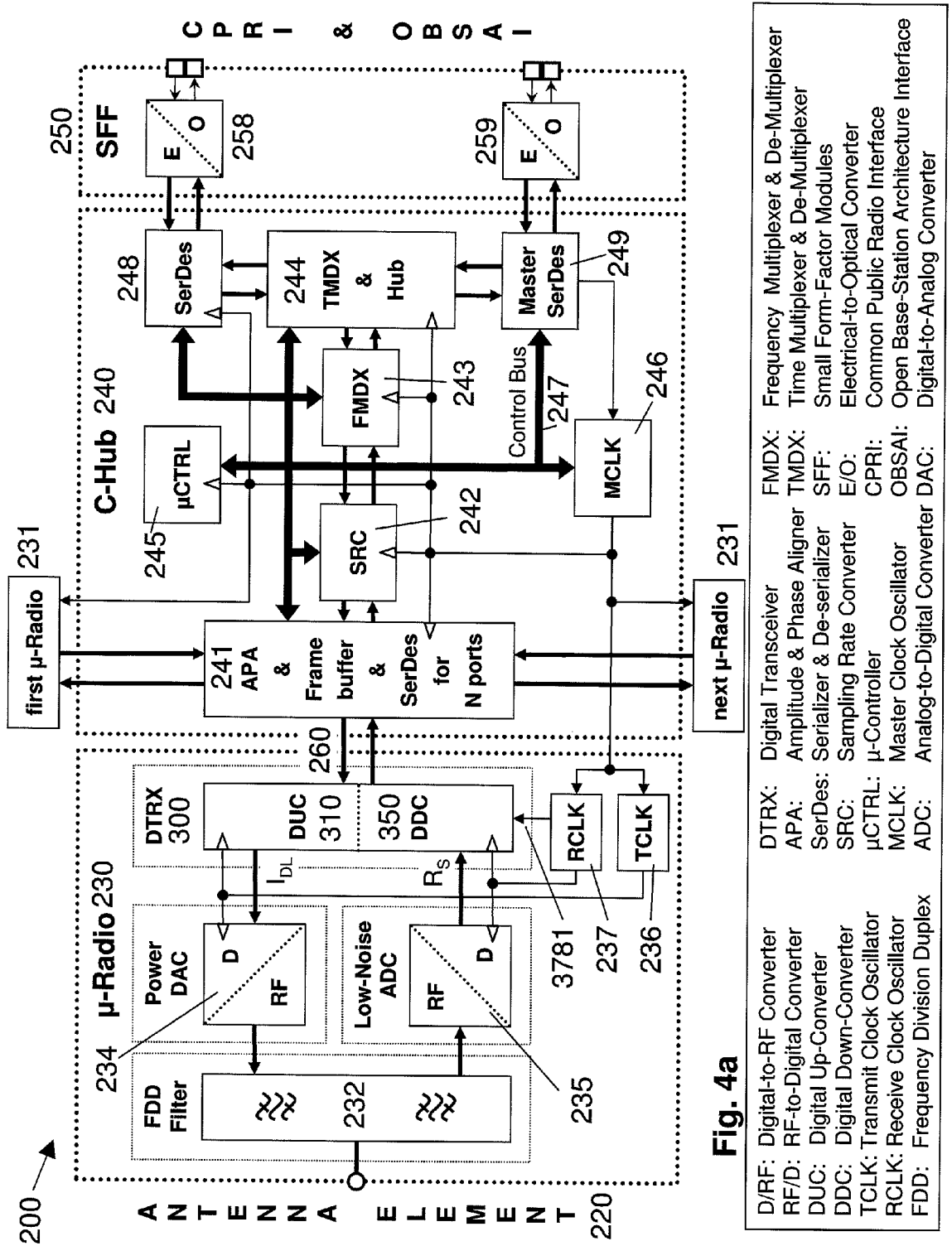
FIG. 4a shows in detail the components of a digital radio unit for FDD radio links according to the teachings disclosed herein.

FIG. 4a shows in greater detail a micro radio 230 and a C-hub 240 connected via a digital bi-directionally serial link (260) forming together a digital radio unit 200 according to the teachings disclosed herein. The antenna element 220 is directly connected to the micro radio 230. The antenna element 220 may, for example, be mounted on an antenna board or another circuit board onto which the micro radio 230 is arranged or attached. In an alternative embodiment, the micro radio 230 may be realized directly on the printed board.

The micro radio 230 shown in FIG. 4a is operated in FDD mode, thus comprising a FDD filter unit 232 at its antenna element entry which separates the RF signals in uplink and downlink direction by utilizing a combination of two band-pass filters embedded in the filter unit 232.

In uplink direction, a RF (radio frequency) signal received via the antenna element 220 and filtered by the FDD filter unit 232 is converted into a digital band-pass signal $R_S$ by the low-noise analogue-to-digital converter (ADC) 235. The ADC 235 and the digital down converter DDC 350 are clocked by a receive clock oscillator (RCLK) 237. The digital band-pass signal $R_S$ is down converted into a digital base-band signal by the digital down converter (DDC) 350 integrated in a digital transceiver (DTRX) 300. The DTRX 300 is arranged at the digital port of the micro-radio 230 from where the digital base-band signal is transferred to the C-hub 240.

The ADC 235 comprises a low-noise amplifier followed by a continuous-time sigma-delta band-pass modulator, both known in the art. The continuous-time sigma-delta band-pass modulator converts the incoming RF signal into the digital band-pass signal $R_S$ by utilizing a 2 or 3 level quantizer at a sample rate being 4 or 4/3 times the RF carrier frequency. Thus, the digital band-pass signal $R_S$ comprises the representative levels +1, −1 or +1, 0, −1 coded by one or two bits, respectively. This digital signal format is further on termed as 'single/1.5 bit' or 'bi-serial' in contrast to a 'multi-bit' format comprising more than 3 representative levels.

In downlink direction, a digital base-band signal received from the C-hub 240 is input into the DTRX 300 of the micro-radio 230 where it is up-converted into a digital band-pass signal $I_{DL}$ by a digital up-converter (DUC) 310. The digital band-pass signal $I_{DL}$ is then transferred to a power digital-to-analogue converter (PDAC) 234 where it is converted into a RF signal. The PDAC 234 and DUC 310 are clocked by the transmit clock oscillator (TCLK) 236 at a sample rate being 4 or 4/3 times the RF carrier frequency. The RF signal is then passed through the FDD filter unit 232 and radiated via the antenna element 220. A separate power amplifier normally used in RF transmitters is not necessary because the power digital-to-analogue converter (PDAC) 234 provides a sufficiently powered RF signal to be radiated via the antenna element 220.

Figure 4B:
Figure 4C:
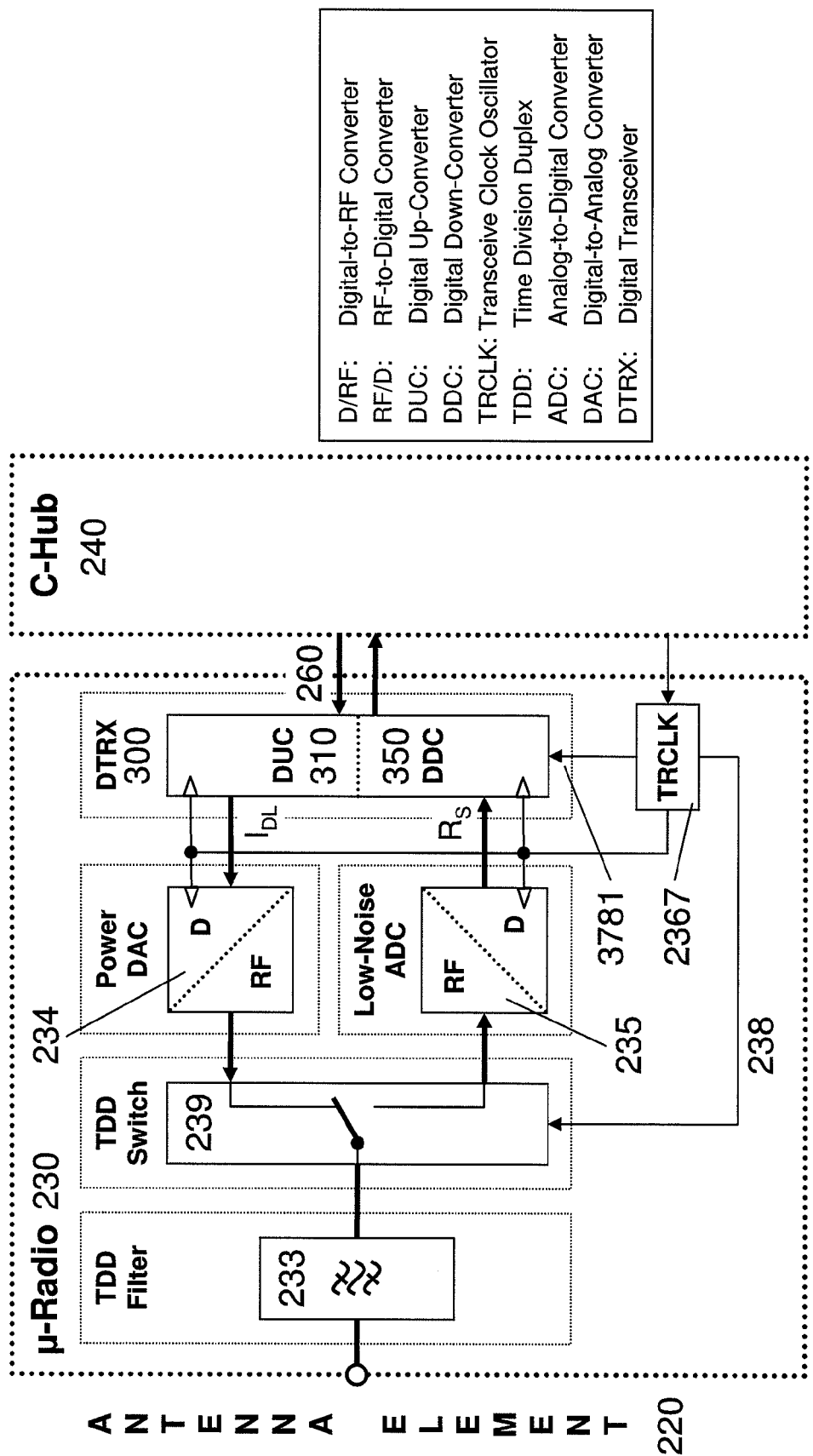
FIG. 4c shows in detail the components of a micro radio for TDD radio links according to the teachings disclosed herein.

The micro radio 230 shown in FIG. 4c is operated in TDD mode, thus comprising a TDD filter unit 233 at its antenna element entry followed by a TDD switch 239 which separates the RF signals in uplink and downlink direction within the time domain. The TDD switch 239 is controlled by a periodic signal 238 which is generated within the transceive clock oscillator (TRCLK) unit 2367 utilizing a synchronous counter which derives the periodic signal 238 from the transmit clock signal, a method well known in the art. The TRCLK unit 2367 further provides a common sampling clock for the transmit path as well as the receive path of the micro radio 230 plus a sub-sampling pulse (3781) for the DDC (350) utilizing another synchronous counter. The common sampling clock is sufficient because in TDD mode the same carrier frequency is used uplink and downlink, thus the sampling clock frequency being 4 or 4/3 times the carrier frequency (as discussed above) is also the same used uplink and downlink. All other elements and functions of the micro radio 230 operated in TDD mode are the same as shown in FIG. 4a for the micro radio 230 operated in FDD mode.

The digital up-converter (DUC) 310 contains one time-discrete sigma-delta band-pass modulator or alternatively two time-discrete sigma-delta low-pass modulators. In both cases, the modulators perform coarse quantization by use of 2 or 3 levels only providing a single/1.5 bit signal at the output. Thus, the digital band-pass signal $I_{DL}$ being generated by the digital up-converter (DUC) 310 only comprises the representative levels +1, −1 or +1, 0, −1 coded by one or two bits, respectively. Therefore, the power digital-to-analogue converter (PDAC) 234 utilizes only 2 or 3 voltage levels, respectively, to represent the digital band-pass signal $I_{DL}$ in the analogue domain.

The transmit clock oscillator (TCLK) unit 236 and the receive clock oscillator (RCLK) unit 237 are each comprising mainly a voltage controlled oscillator (VCO) embedded in a phase-locked loop (PLL) used for synchronization purposes. Clock oscillators utilizing a VCO plus PLL are known in the art and standard components or architectures may be applied.

It should be noted here, that those embodiments of the teachings disclosed herein where the samples of signals $I_{DL}$ and $R_S$ are represented in the 2-level format can be interpreted as a special case of the major embodiments of the teachings disclosed herein utilizing the 3-level format to represent the samples of signals $I_{DL}$ and $R_S$. In both cases, two's complement arithmetic is applied. In case of the major embodiments, the representative levels +1, 0, −1 are coded by two bits where the upper bit denotes the sign-bit whilst the lower bit denotes the zero-bit being cleared (low state) when a zero-sample occurs. Thus, the major embodiments of the teachings disclosed herein can be operated also in a special mode using the 2-level format by keeping the zero-bit always at high state (non-zero).

The micro-radio 230 is connected to the C-hub 240. A bi-directional serial link (260) between the micro-radio 230 and the C-hub 240 is based on the well known standard termed 'SerDes'.

As known in the art, SerDes utilizes a self-clocking and DC-free channel code termed '8B/10B' representing each data byte by a code word comprising 10 bits whilst dedicated sequences of 10 bits are provided for synchronization. The SerDes functionality basically comprises parallel-to-serial as well as serial-to-parallel conversion, channel coding and decoding plus clock recovery and synchronization.

In low-cost CMOS technologies, SerDes supports symbol rates up to 2.5 Giga Baud representing a gross data rate of 2.0 Giga bits per second equivalent to 250 Mega bytes per second due to code rate 0.8 of the 8B/10B channel code.

An example of the data format used on the bi-directional serial link (260) between the micro radio 230 and the C-Hub 240 is shown in FIG. 4b and described in detail below.

The C-hub 240 comprises an amplitude and phase aligner (APA) 241 including a frame buffer and a serializer/de-serializer. APA 241 has N-ports for connecting N micro-radios. A plurality of micro-radios 230, 231 may be connected to one of the C-Hubs 240 as described with respect to FIG. 3c. In total N of the micro radios 230, 231 may be each connected to a port of the N-port phase aligner 241 and the signals received and transmitted from each one of the micro radios 230, 231 are treated in parallel and/or series by the subsequent components of C-Hub 240. The additional first and next micro-radios 231, may be identical to micro-radio 230, shown in greater detail in FIG. 4a.

The C-hub 240 comprises as further components a sample rate converter (SRC) 242 for adjusting the sampling frequency of the complex base-band signal to the RF carrier frequency, a frequency multiplexer/de-multiplexer (FMDX) 243, a unit 244 comprising time multiplexer/de-multiplexers (TMDX) around a hub and finally a master serializer/de-serializer (SerDes) 249 plus one or more serializers/de-serializers (SerDes) 248.

The TMDX and hub unit 244 performs packet data handling and distribution of data streams in CPRI and/or OBSAI format controlled by adjacent signalling information. Thus, only those data packets which are dedicated to be received and transmitted by the connected micro-radios 230, 231 are handed over from/to the FMDX unit 243 for further processing. Other data packets are passed through via the CPRI and/or OBSAI links supporting the so called cascading. The data packets contain I and Q samples of base-band signals in a given packet format which is identified by the adjacent signalling information. The packet format defines the number and word length of the samples, the bandwidth of the base-band signal being represented by said samples and the frequency of its sub-carrier.

The frequency multiplexer/de-multiplexer (FMDX) unit 243 comprises several digital modulators and de-modulators for simultaneously up and down converting a variety of base-band signals to/from its respective sub-carrier frequencies. The modulated signals can be easily combined in the frequency domain by use of a simple adder stage, thus enabling multi-carrier operation.

All components of the C-hub 240 are controlled by a micro-controller (μCTRL) 245 to whom they are connected via a control bus 247 and clocked by a master clock oscillator (MCLK) unit 246 comprising a voltage controlled oscillator (VCO) embedded in a phase-locked loop (PLL) used for synchronization purposes. The master clock oscillator 246 must be synchronized to the clock frequency of the CPRI and/or OBSAI transport signal (both of which formats utilize the self-clocking SerDes protocol) derived by the clock recovery unit within the master serializer/de-serializer (SerDes) 249. The master clock oscillator (MCLK) 246 also synchronizes the transmit clock oscillator 236 and the receive clock oscillator 237 of the micro radios 230/231.

All components of the C-hub 240 can be commercially available components known to a person skilled in the art.

A small form-factor module (SFF) 250 comprising one or more electro-optical converters (E/O) 258 and 259 is connected to the SerDes 248 and 249, respectively. Electro-optical converters are known in the art and are applied to convert the digital electrical signal into an optical signal that can be transferred with known standards such as CPRI (common public radio IF) or OBSAI, i.e. via optical fibres to a digital radio server as shown in FIG. 2.

FIG. 4b shows the data format of the bi-directional serial interface between the micro-radio 230 and the C-Hub 240. A data frame format comprising FL bytes is used in either direction. As depicted in FIG. 4b, the header contains a frame synchronization byte and a control byte followed by K data bytes and some non-dedicated residual bytes free for arbitrary use. Thus, the frame is only partially pay-loaded. This partially pay-loaded frame format combined with frame data buffering enables the tuning of the carrier frequencies used in both transmit and receive paths of the micro-radio 230 whereas the over-sampling ratios $N_T$ and $N_R$ within the DTRX 300 remain constant as well as the clock rate of the bi-directional serial interface being always 2.5 GHz.

Assuming a preferred format of 16 bits or 2 bytes per sample for each in-phase and quadrature component of the complex base-band signal, the sample rate (SR) being transmitted over each serial 2.5 GHz link is given in MHz by SR=125·K/FL.

In practice, FL comprises several hundred bytes whereas SR is in the range of 120 MHz.

Thus, the carrier frequencies used in the micro radio 230 in 4:1 mode can be tuned by a step size $\Delta f_{CT}=\frac{1}{4}N_T \cdot SR_T/FL_T$ in the transmit path and by a step size $\Delta f_{CR}=\frac{1}{4}N_R \cdot SR_R/FL_R$ in the receive path.

Figure 5:
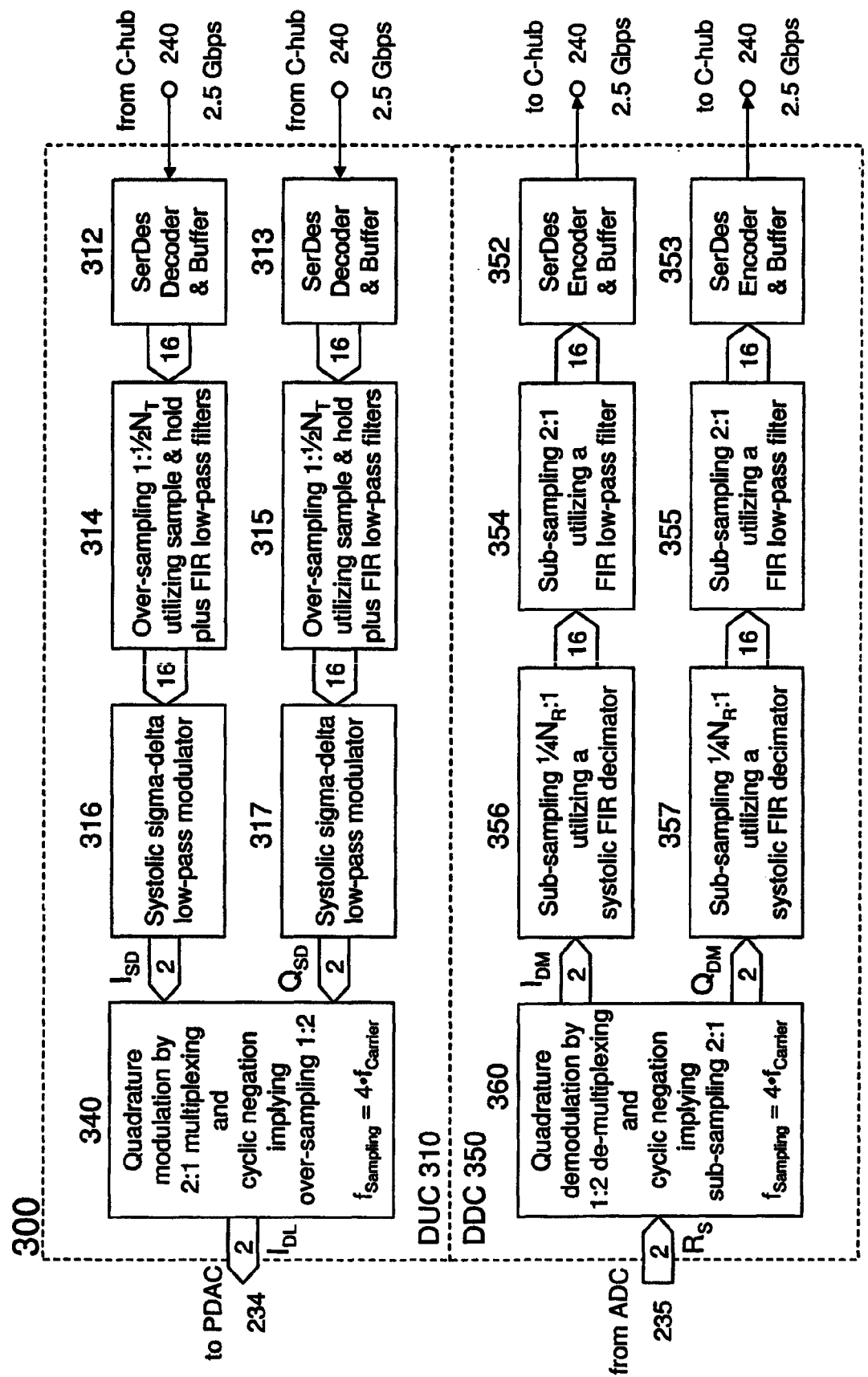
FIG. 5 depicts a functional block diagram of a digital transceiver (DTRX) according to the teachings disclosed herein in 4:1 mode.

When the micro radio 230 is used in 4:1 mode utilizing a DTRX 300 as described in detail with respect to FIG. 5, the micro radio 230 supports complex base-band signals having a bandwidth of 60 MHz at carrier frequencies around 2 GHz. According to Shannon's sampling theorem, each component of this complex base-band signal requires a sampling rate being at least 60 MHz.

Thus, a fine-tuneable over-sampling ratio of approximately 2 is applied by a sample rate converter (SRC) 242 within the C-Hub 240 adapting the base-band sampling rate to those sampling rates $SR_T$ and $SR_R$ utilized on the bi-directional serial interface.

FIG. 5 shows a functional block diagram of a DTRX 300 in a 4:1 operating mode. The DTRX 300 may work over a 60 MHz bandwidth at carrier frequencies around 2 GHz. The DTRX 300 is divided into two parts, the DUC 310 and the DDC 350, that respectively provide base-band to carrier frequency up-conversion and carrier frequency to base-band down-conversion.

In the 4:1 mode and in the transmitting direction, a data signal from C-Hub 240 according to the data format shown in FIG. 4b being based on the SerDes standard is applied to the DUC 310 as an I-signal (in-phase signal) and a Q-signal (quadrature signal). The data signal may be input at rates of 2.5 Gbps. Both signals are first decoded and buffered at a SerDes Decoder and Buffer 312 and 313 for the I-signal $I_0$ and the Q-signal $Q_0$, respectively. The data signals are then further transferred as 16 bit word length signals to units 314 and 315, respectively, comprising sample-and-hold stages plus FIR low-pass filters where the I-signal and the Q-signal are over-sampled by $1:\frac{1}{2} \cdot N_T$. The SerDes Decoders and Buffers 312 and 313 and the over-sampling by sample-and-hold plus FIR low-pass filter units 314 and 315 are known in the art and standard components or architectures may be applied.

Both the I-signal and the Q-signal are then further transferred to systolic sigma-delta low-pass modulators 316 and 317, respectively, which are described in our U.S. Provisional Patent Application No. 60/810,460 and UK Patent Application No. GB 0611096.9, both filed on 2 Jun. 2006. The teachings of this patent application are incorporated herein by reference.

The sigma-delta low pass modulator 316 outputs a 3 level signal $I_{SD}$ and the sigma-delta low pass modulator 317 outputs a 3 level signal $Q_{SD}$. Both 3 level signals comprising the values +1, 0, −1 are each represented by 2 bits, thus being further addressed as '2-bit signals'.

Both 2-bit signals $I_{SD}$ and $Q_{SD}$ are applied to a quadrature modulation by multiplexing and cyclic negation block 340 in which the signal $I_{SD}$ and the signal $Q_{SD}$ are over-sampled by 1:2, cyclically negated and 2:1 multiplexed to a single 2-bit output signal $I_{DL}$ applied to the PDAC 234 shown in FIG. 4a. The function of the quadrature modulation by multiplexing and cyclic negation block 340 will be described in detail with respect to FIGS. 7a, 7b and 8a-i.

In receiving direction a 2-bit signal $R_S$ also representing 3 levels (+1, 0, −1) is received at the DTRX 300 from the ADC 235 shown in FIG. 4a and applied to a quadrature de-modulation by de-multiplexing and cyclic negation block 360 of DDC 350 in DTRX 300. The 2-bit signal $R_S$ is 1:2 de-multiplexed, cyclically negated and 2:1 sub-sampled to a 2-bit I-signal $I_{DM}$ and a 2-bit Q-signal $Q_{DM}$. The function of the quadrature de-modulation by de-multiplexing and cyclic negation block 360 will be explained in detail with respect to FIGS. 10 and 11.

The signals $I_{DM}$ and $Q_{DM}$ are further passed on to systolic FIR decimator blocks 356 and 357, respectively, where the signals are decimated by FIR filtering and $\frac{1}{4} \cdot N_R:1$ sub-sampling and output as a 16-bit I-signal and a 16-bit Q-signal. The systolic FIR decimator blocks 356 and 357 will be described in detail with respect to FIGS. 12, 13 and 14.

From the systolic FIR decimator blocks 356 and 357 the I-signal and the Q-signal are further transferred as 16-bit signals to FIR low-pass and sub-sampling blocks 354 and 355, respectively, where the I-signal and the Q-signal are 2:1 sub-sampled. Both the I-signal and the Q-signal are then passed on to a SerDes encoder and buffer 352 and 353, respectively, from where the I-signal and the Q-signal are output from the DDC 350 and sent to C-hub 240 as shown in FIG. 4a. The FIR low-pass and sub-sampling blocks 354 and 355 and the SerDes encoders and buffers 352 and 353 are known in the art and standard components or architecture may be applied.

Figure 6A:
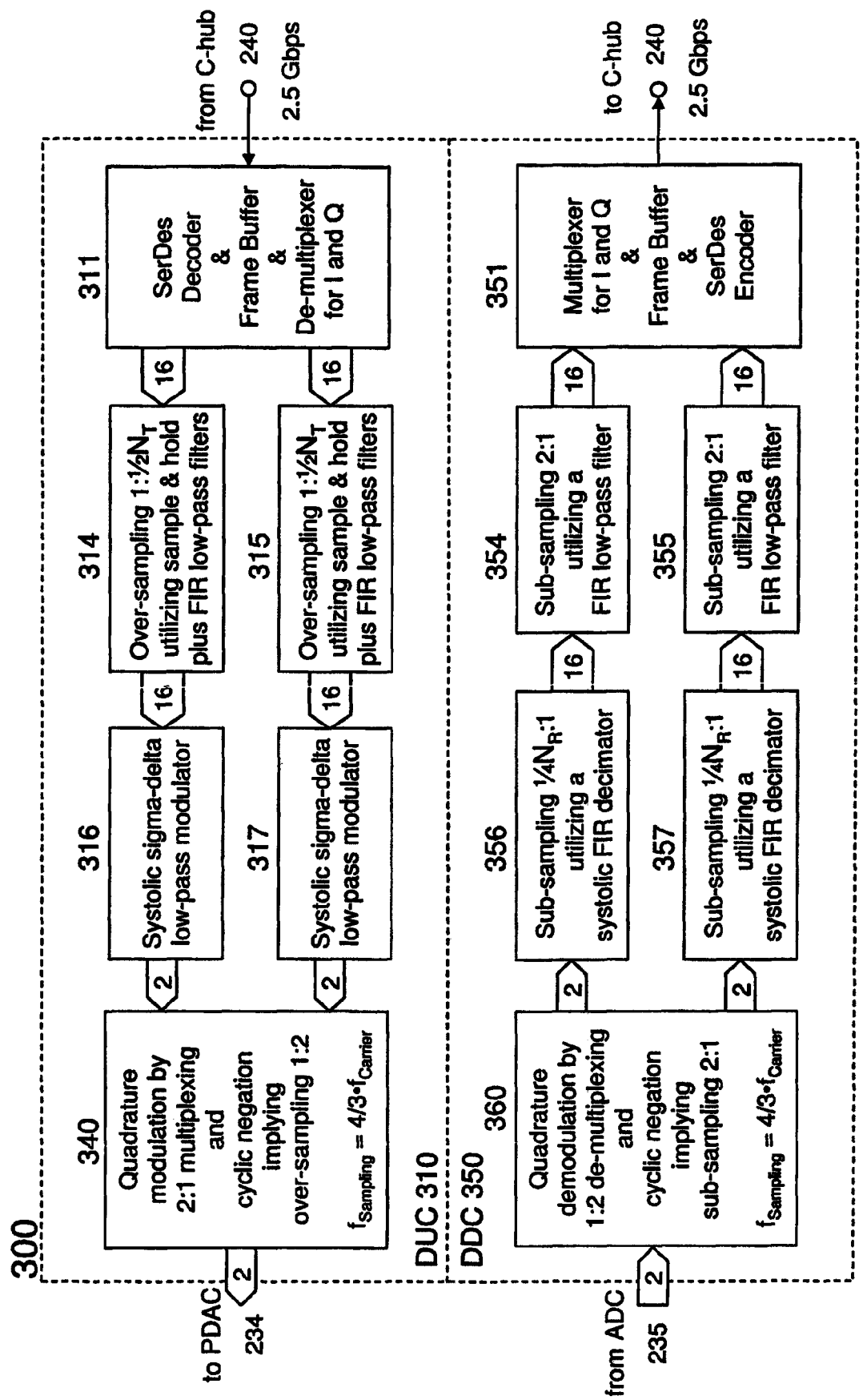
FIGS. 6a and 6b show functional block diagrams of two embodiments of a digital transceiver (DTRX) in 4:3 mode.
Figure 6B:
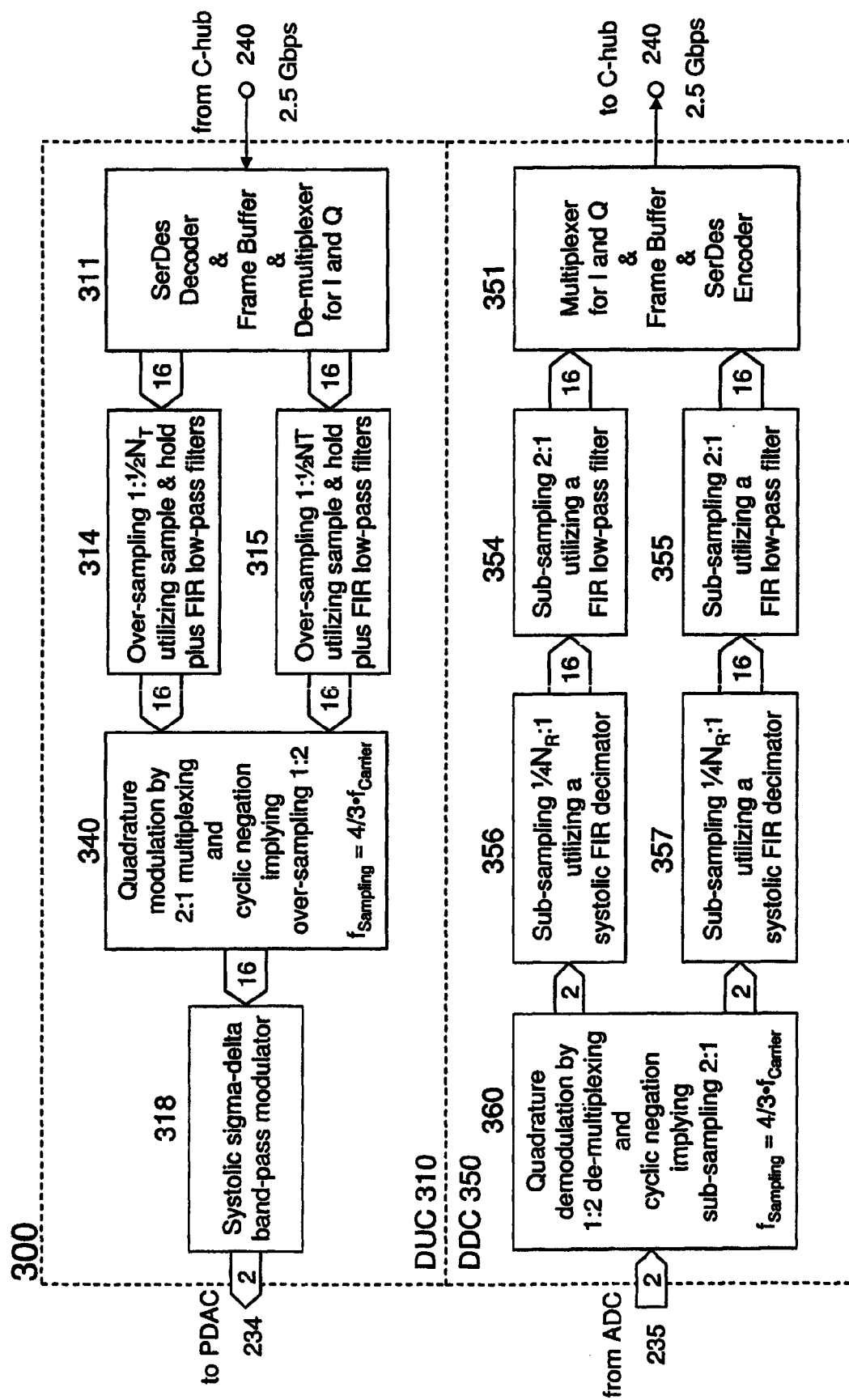

FIGS. 6a and 6b show a functional block diagram of two different alternative embodiments of DTRX 300 in 4:3 operating mode (4:3 mode). In 4:3 mode, the DTRX 300 may work at a 20 MHz bandwidth at carrier frequencies around 2 GHz.

In 4:3 mode the DTRX 300 and its component may be the same or similar to the DTRX used in 4:1 mode as described with respect to FIG. 5. Thus, the DTRX in 4:3 mode is divided into two parts, the DUC 310 and the DDC 350, that provide base-band to carrier frequency up-conversion and carrier frequency to base-band down-conversion, respectively.

In contrast to the 4:1 mode, a data signal from C-Hub 240 in 4:3 mode is applied to the DUC 310 as a single bit stream only. The data signal may be input at rates of 2.5 Gbps. The incoming signal is first decoded, buffered, and de-multiplexed into an I-signal and a Q-signal by a SerDes decoder, frame buffer and de-multiplexer block 311. The de-multiplexed and separated I-signal and Q-signal are further transferred separately as 16-bit word length signals to over-sampling by sample-and-hold plus FIR low-pass filter units 314 and 315, respectively, as described above with respect to FIG. 5. All further signal treatment of this embodiment is identical to the 4:1 mode described above. I-signal and Q-signal are further passed from over-sampling by sample-and-hold plus FIR low-pass filter units 314 and 315 to systolic sigma-delta low-pass modulators 316 and 317, respectively.

Each of the sigma-delta low pass modulators 316 and 317 outputs a 3 level signal (+1, 0, −1) represented by 2 bits, thus being addressed as '2-bit signal'. Both 2-bit output signals of the sigma-delta low-pass modulators 316 and 317 are connected to the quadrature modulation by multiplexing and cyclic negation block 340, where the I-signal and Q-signal are over-sampled by 1:2, cyclically negated and 2:1 multiplexed into a single 2-bit output signal applied to the PDAC 234 shown in FIG. 4a. In 4:3 mode however, the sampling rate is $f_{Sampling} = 4/3 \cdot f_{Carrier}$.

In receiving direction of the embodiment shown in FIG. 6a and analogous to the embodiment of FIG. 5, a 2-bit signal is received from the ADC 235 shown in FIG. 4a and applied to a quadrature de-modulation by de-multiplexing and cyclic negation block 360 of DDC 350 in DTRX 300 working in 4:3 mode. The signal is 1:2 de-multiplexed, cyclically negated and 2:1 sub-sampled into an I-signal (in-phase signal) and a Q-signal (quadrature signal) at $f_{Sampling} = 4/3 \cdot f_{Carrier}$. The 2-bit I-signal and the 2-bit Q-signal are further passed on to systolic FIR decimators 356 and 357, respectively, and then transferred as 16-bit signals to FIR low-pass and sub-sampling blocks 354 and 355, respectively.

In contrast to the 4:1 mode embodiment shown in FIG. 5, in the 4:3 mode both 16-bit signals are then applied to one multiplexer, frame buffer, and SerDes encoder 351, from where the multiplexed signal is output from the DDC 350 and sent to C-hub 240 as shown in FIG. 4a.

FIG. 6b illustrated yet another example of a DTRX 300 in 4:3 mode. In this embodiment and in transmitting direction of the DUC 310, the quadrature modulation by multiplexing and cyclic negation block 340, which may be comparable to the quadrature modulation by multiplexing and cyclic negation block 340 of the embodiment of FIGS. 5 and 6a, is connected directly to both over-sampling by sample-and-hold plus FIR low-pass filter units 314 and 315. The I-signal and Q-signal provided at the outputs of units 314 and 315 are over-sampled by 1:2, cyclically negated and 2:1 multiplexed into a single 16-bit output signal that is applied to a single systolic sigma-delta band-pass modulator 318, which is described in our U.S. Provisional Patent Application No. 60/810,460 and UK Patent Application No. GB 0611096.9, both filed on 2 Jun. 2006. The 2-bit output signal of the single systolic sigma-delta band-pass modulator 318 is then applied to the PDAC 234.

The receiving DDC 350 may in this embodiment be identical to that described with respect to FIG. 6a.

FIG. 7a shows a unit 3400 comprising a generic digital quadrature modulator 3410 combined with a 1:2 over-sampling pre-stage 3200. The over-sampling pre-stage 3200 consists of two equally tapped FIR low-pass filters 3360 and 3370 as well as two interpolating blocks 3260 and 3270 which are fed by the input signals $I_{SD}$ and $Q_{SD}$. Over-sampling 1:2 prior to the quadrature modulator is needed because the signals $I_{SD}$ and $Q_{SD}$ are output by sigma-delta low-pass modulators generating significant out-of-band quantization noise. Without the over-sampling pre-stage 3200 the out-of-band quantization noise would be shifted by the quadrature modulation process into the pass-band of the band-pass signal $I_{DL}$ at the modulator output. FIG. 7b shows illustrative examples of corresponding signals.

In a first step below, the functionality of the unit 3400 will be explained in detail referring to FIGS. 7a and 7b. In a second step, it will be shown for a special case being relevant for the embodiments of the teachings disclosed herein that the functionality of the unit 3400 is equivalent to the functionality of the quadrature modulation by multiplexing and cyclic negation block 340 of the DUC 310 of the DTRX 300 of FIG. 5. However, the realization of the quadrature modulation by multiplexing and cyclic negation block 340 is much simpler compared to a realization of the unit 3400.

The 2-bit I-signal $I_{SD}$ from the systolic sigma-delta low-pass modulator 316 as depicted in FIG. 5 is assumed to be applied to an interpolating block 3260 of the over-sampling pre-stage 3200. In parallel, the 2-bit Q-signal $Q_{SD}$ from the systolic sigma-delta low-pass modulator 317 is assumed to be applied to an interpolating block 3270 of the over-sampling pre-stage 3200. Examples of sequences of input signals $I_{DS}$ and $Q_{DS}$ are shown in FIGS. 8a and 8b, respectively.

At the interpolating blocks 3260 and 3270, $I_{SD}$ and $Q_{SD}$ are 1:2 over-sampled respectively. First, the clock rate is doubled and zero samples are inserted in signals $I_{SD}$ and $Q_{SD}$ obtaining signals $I_{SD\uparrow 2z}$ and $Q_{SD\uparrow 2z}$. Examples for the signals $Q_{SD}$ and $Q_{SD\uparrow 2z}$ are shown in FIG. 7b. The signals $I_{SD\uparrow 2z}$ and $Q_{SD\uparrow 2z}$ are then applied to low-pass filters 3360 and 3370, respectively where the signals $I_{SD\uparrow 2z}$ and $Q_{SD\uparrow 2z}$ are each divided into two lines. One line is directly applied to adders 3340 and 3350, respectively, while the other line is passed through registers 3320 and 3330, respectively. In registers 3320 and 3330, the signal is delayed by one clock cycle and then applied to the adders 3340 and 3350, respectively, resulting in signals $I_{DS\uparrow 2}$ and $Q_{DS\uparrow 2}$ showing duplicated adjacent samples, examples of which are shown in FIGS. 7b, 8d and 8e.

It should be noted that the duplication of adjacent samples as a result of an interpolation by equally tapped FIR low-pass filtering can be performed also by use of a sample-and-hold stage. In case of higher over-sampling ratios, the use of a sample-and-hold stage is much more economic compared to equally tapped FIR low-pass filters. Therefore, sample-and-hold stages are utilized within the over-sampling blocks 314 and 315 as depicted in FIGS. 5, 6a and 6b.

The signals $I_{DS\uparrow 2}$ and $Q_{DS\uparrow 2}$ are further applied to the quadrature modulator 3410. In the generic digital quadrature modulator 3410 the over-sampled input signals $I_{SD\uparrow 2}$ and $Q_{SD\uparrow 2}$ are pair wise multiplied in multipliers 3460 and 3470 by the two components $I_0$ and $Q_0$, respectively, of a complex carrier signal (I denotes the respective in-phase component and Q denotes the respective quadrature component). Examples of signals $I_0$ and $Q_0$ are illustrated in FIGS. 8c and 8f, respectively. Feeding the resulting signal products $I_0 \cdot I_{DS\uparrow 2}$ as shown in FIG. 8g and $Q_0 \cdot Q_{DS\uparrow 2}$ as shown negated in FIG. 8i into a comparator stage 3480 yields at the output of the quadrature modulator 3410 the in-phase component $I_{DL}$ of the complex digital band-pass signal for the down-link channel. The resulting example signal $I_{DL}$ is shown in FIG. 8h.

Figure 8:
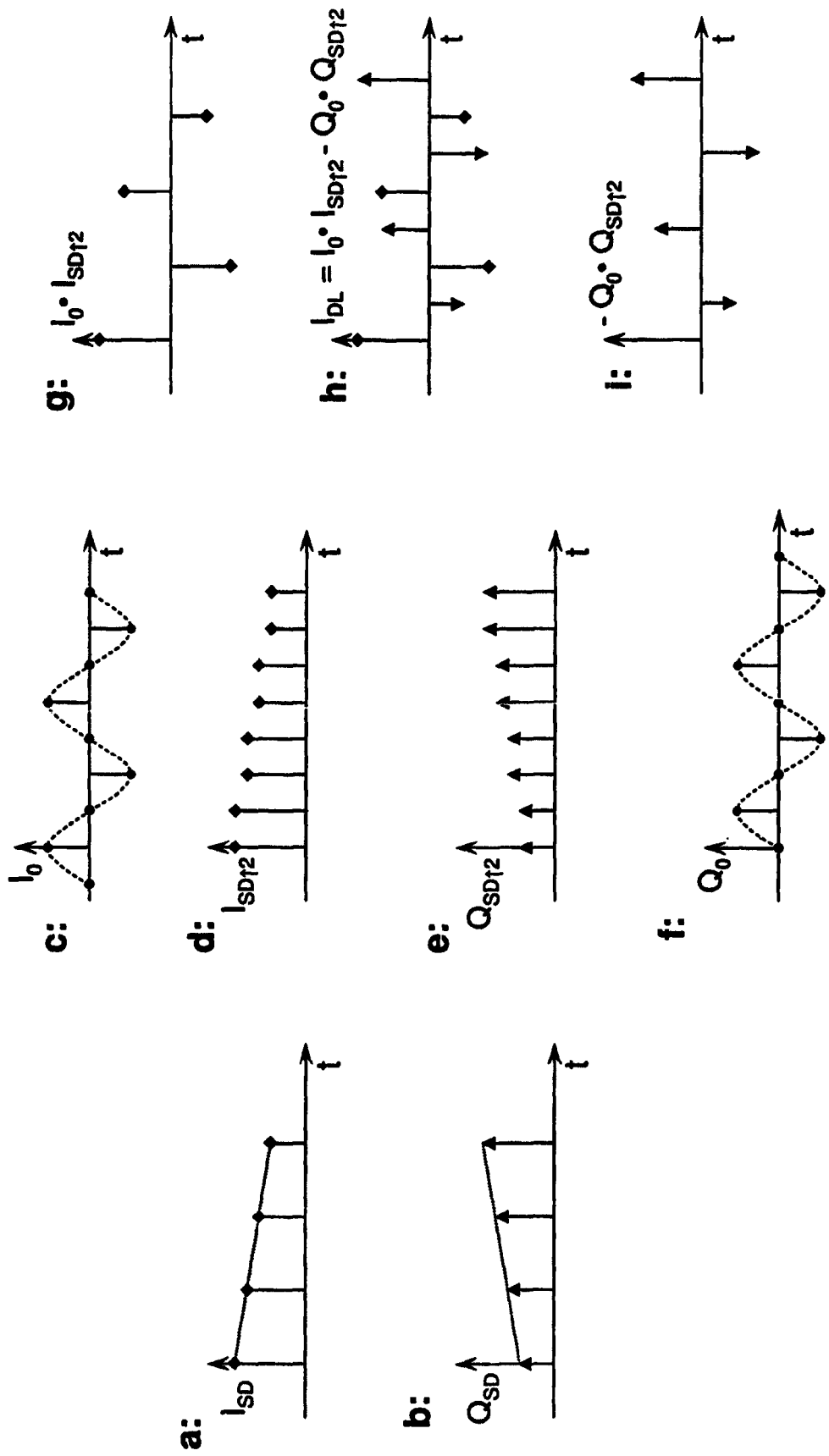

A preferred choice of the sampling frequency being four times the carrier frequency is demonstrated by the signal diagrams in FIG. 8. In this particular case, the quadrature modulator 3410 and the over-sampling pre-stage 3200 together are interlacing both input signals $I_{SD}$ and $Q_{SD}$ whilst the input signals $I_{SD}$ and $Q_{SD}$ signals are cyclically negated to generate the output signal $I_{DL}$ as illustrated in FIG. 8h.

Figure 9:
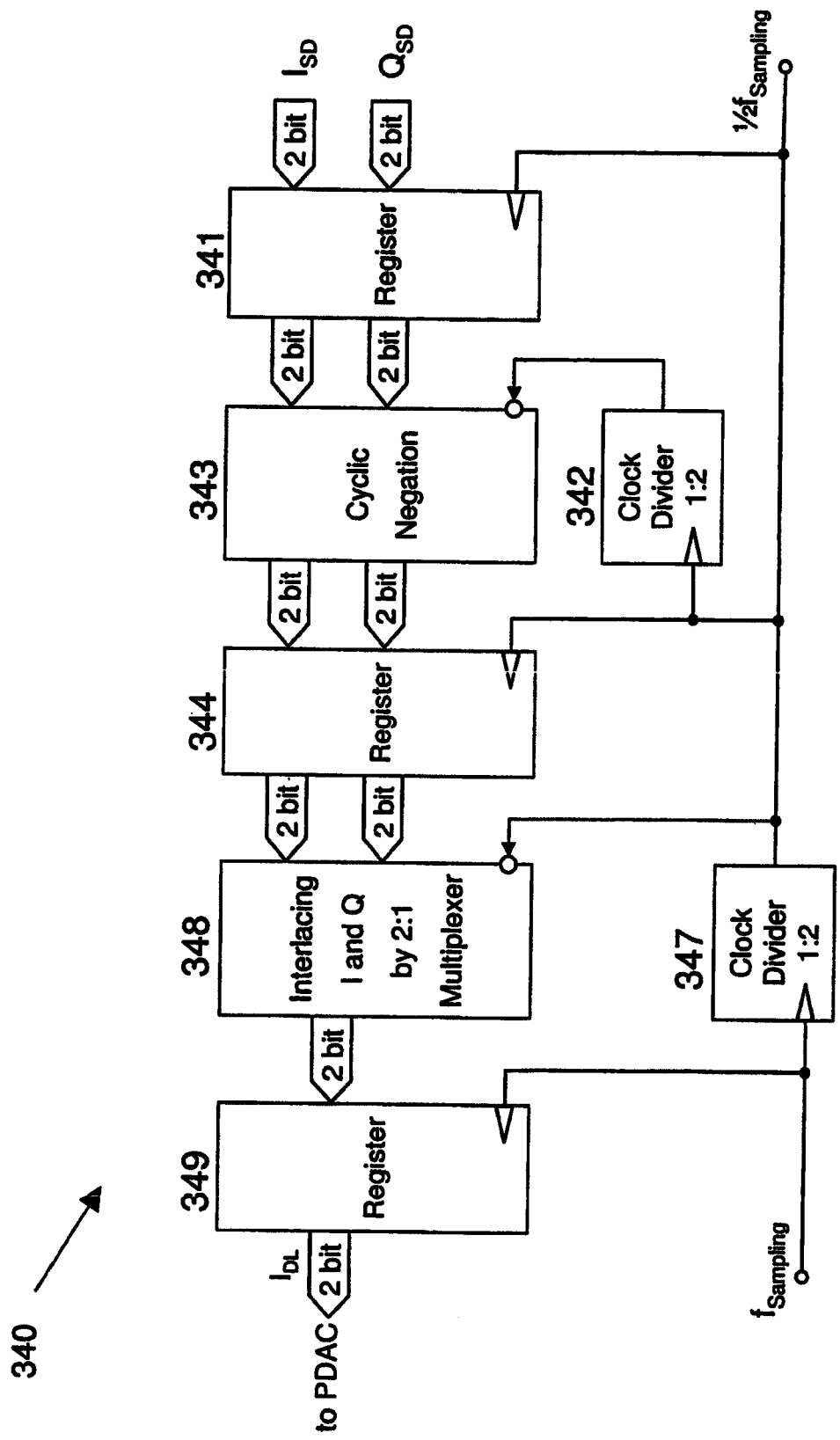
FIG. 9 shows a pipelined realization of the quadrature modulation by 2:1 multiplexing and cyclic negation block of the DUC of FIG. 5.

Therefore, the generic digital quadrature modulator 3410 together with the over-sampling pre-stage 3200 of FIG. 7a can be replaced by a much simpler circuitry 340 illustrated in FIG. 9 comprising only a multiplexer 348 to interlace the input signals $I_{SD}$ and $Q_{SD}$ and cyclically controlled inverters, provided that the 2-bit input signals $I_{SD}$ and $Q_{SD}$ are generated in two's complement notation. Thus, the cyclic negation can be performed by inverting the upper bit denoting the sign of the 3 level signal (+1, 0, −1) but only in the non-zero case whilst the lower bit denoting a zero remains unchanged in any case.

FIG. 9 shows the unit 340 performing quadrature modulation in 4:3 mode by 2:1 multiplexing and cyclic inversion. 2-bit input signals $I_{SD}$ and $Q_{SD}$ are first red into register 341, transferred to a cyclic negation block 343 clocked by clock the divider 342. In the cyclic negation block 343 the I- and Q-signals are cyclically negated by inverting the upper bit but only in the non-zero case. Subsequently, the cyclically negated I- and Q-signals are transferred into register 344 before they are interlaced by a 2:1 multiplexer 348. Interlacing I and Q by the 2:1 multiplexer 348 is triggered by second clock divider 347. Thus, at a duplicated clock cycle both I and Q signals are 1:2 over-sampled in course of being interlaced by multiplexing to one 2-bit signal that is transferred to register 349 from where it is output as $I_{DL}$ signal towards PDAC 234.

Quadrature modulation by 2:1 multiplexing and cyclic negation according to FIG. 9 can be realized as pipelined logic using exclusively low cost CMOS technology even in high speed applications being clocked at several GHz.

Figures 10, 11:
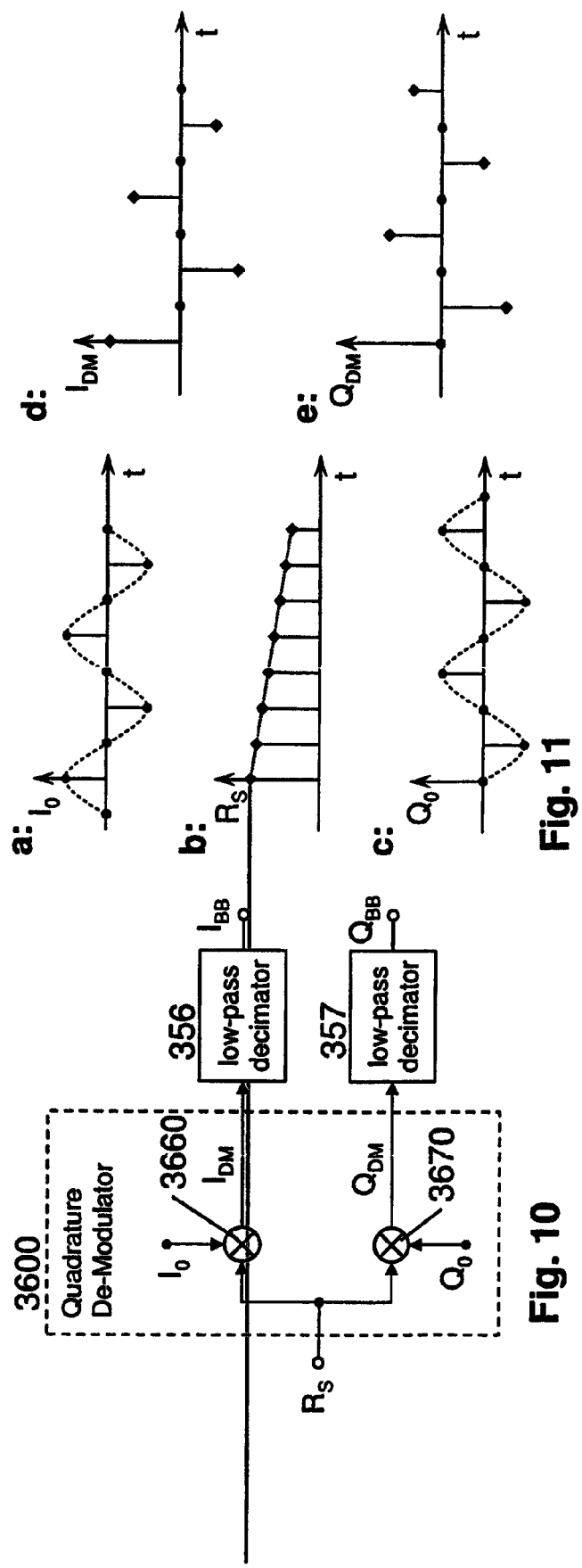
FIG. 10 shows the structure of a generic digital quadrature de-modulator followed by low-pass decimators having together the identical functionality as the quadrature de-modulation by de-multiplexing and cyclic negation block and low-pass decimators of the DDC of FIG. 5.
FIG. 11 shows illustrative examples of signals at different lines of FIG. 10.

A generic digital quadrature de-modulator 3600 followed by two low-pass decimators 356 and 357 is depicted in FIG. 10. The incoming receiver signal $R_S$ is multiplied by two components $I_0$ and $Q_0$ of the conjugated complex carrier signal by multipliers 3660 and 3670, respectively, where $I_0$ denotes the in-phase component and $Q_0$ denotes the quadrature component. Each output signal $I_{DM}$ and $Q_{DM}$ of quadrature de-modulator 3600 passes a low-pass decimator 356 and 357 comprising a low-pass filter followed by a sub-sampler to achieve two components $I_{BB}$ and $Q_{BB}$ of the complex baseband signal at the outputs of the low-pass decimators 356 and 357.

A preferred choice of the sampling frequency being four times the carrier frequency is demonstrated by the signal diagrams shown in FIG. 11. In this particular case the samples of signal $R_S$ illustrated as example in FIG. 11b are alternately passed to the de-modulator outputs $I_{DM}$ and $Q_{DM}$ illustrated as examples in FIGS. 11d and e, respectively, whilst being cyclically negated by the process of de-modulation. Therefore, the two multipliers 3660 and 3670 can be economically replaced by a simple de-multiplexer and cyclically controlled inverters, provided that the 2-bit input signal $R_S$ is given in two's complement notation. Thus, the cyclic negation is performed by inverting the upper bit denoting the sign of the 3 level signal $R_S$ (+1, 0, −1) but only in the non-zero case whilst the lower bit denoting a zero remains unchanged in any case.

As a preferred embodiment of the teachings disclosed herein, the functionality of a generic digital quadrature de-modulator 3600 according to FIG. 10 is implemented as quadrature de-modulation by de-multiplexing and cyclic negation within block 360 followed by low-pass decimators 356 and 357 of the DDC 350 of DTRX 300 of FIG. 5. Block 360 can be realized as simple pipelined logic using exclusively low cost CMOS technology even in high speed applications being clocked at several GHz.

Furthermore, the low-pass decimators 356 and 357 can be operated at half the sampling frequency of the sampled receiver signal $R_S$ because every second sample of both decimator input signals $I_{DM}$ and $Q_{DM}$ has alternately a zero value.

Figure 12:
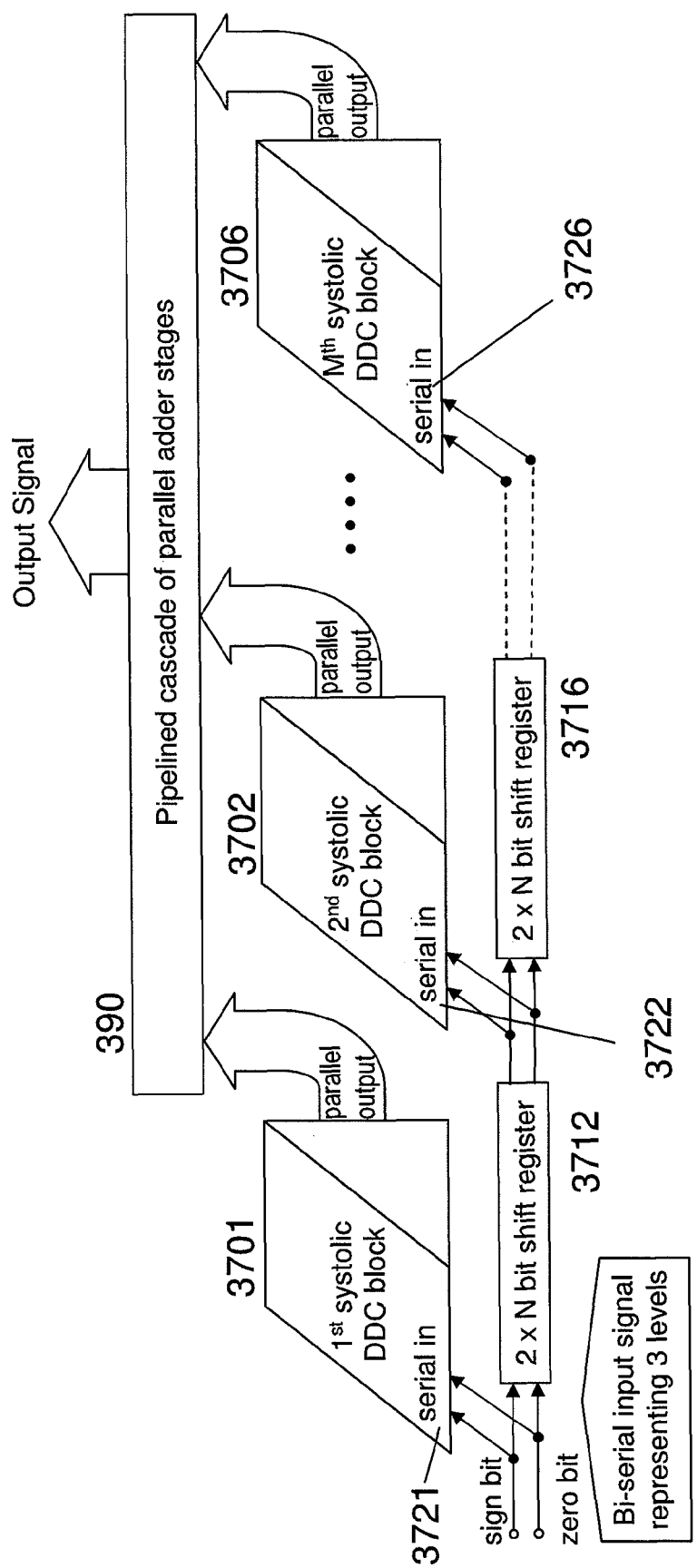
FIG. 12 shows the block diagram of a systolic N:1 decimator for digital down conversion.

FIG. 12 shows a block diagram of a systolic FIR decimator utilized for digital down conversion. The example shown is adapted for digital decimation of a 1.5 bit signal. The systolic FIR decimator comprises a FIR filter having N×M coefficients combined with N:1 sub-sampling and can be applied as sub-sampling unit 356 and 357, respectively, within the DDC 350 of FIG. 5.

A decimation process performing FIR filtering plus sub-sampling is realized using a number of M systolic DDC blocks 3701, 3702 up to 3706. A plurality of the M DDC blocks 3701, 3702 up to 3706 may be arranged and work in parallel. Each one of the M DDC blocks 3701, 3702 up to 3706 performs a convolution of the bi-serial input signal by a subset of N filter coefficients plus sub-sampling. Thus, all of the M DDC blocks 3701, 3702 up to 3706 work simultaneously in consecutive windows of length N to jointly carry out the convolution.

The 1.5 bit signal, a bi-serial input signal representing 3 levels (+1, 0, −1), is applied to the DDC blocks 3701, 3702 up to 3706 at inputs 3721, 3722 up to 3726 as a parallel set of a zero-bit signal and a sign-bit signal.

Each one of the consecutive windows comprises N filter coefficients of word length L and N samples of the input signal being aligned in time by the shift registers 3712 up to 3716 being arranged between the signal inputs 3721, 3722 up to 3726 of each of the DDC blocks 3701, 3702 up to 3706.

The convolution plus sub-sampling is executed by multiplying each one of the N filter coefficients by the associated one of the N samples of the input signal and accumulating the resulting products within the window of length N.

Finally, the parallel output signals of all of the M DDC blocks 3701, 3702 up to 3706 have to be added by a pipelined cascade 390 of parallel adder stages. The values for M and N are arbitrary integers, however, the output word length of the DDC blocks should not exceed N.

Figure 13:
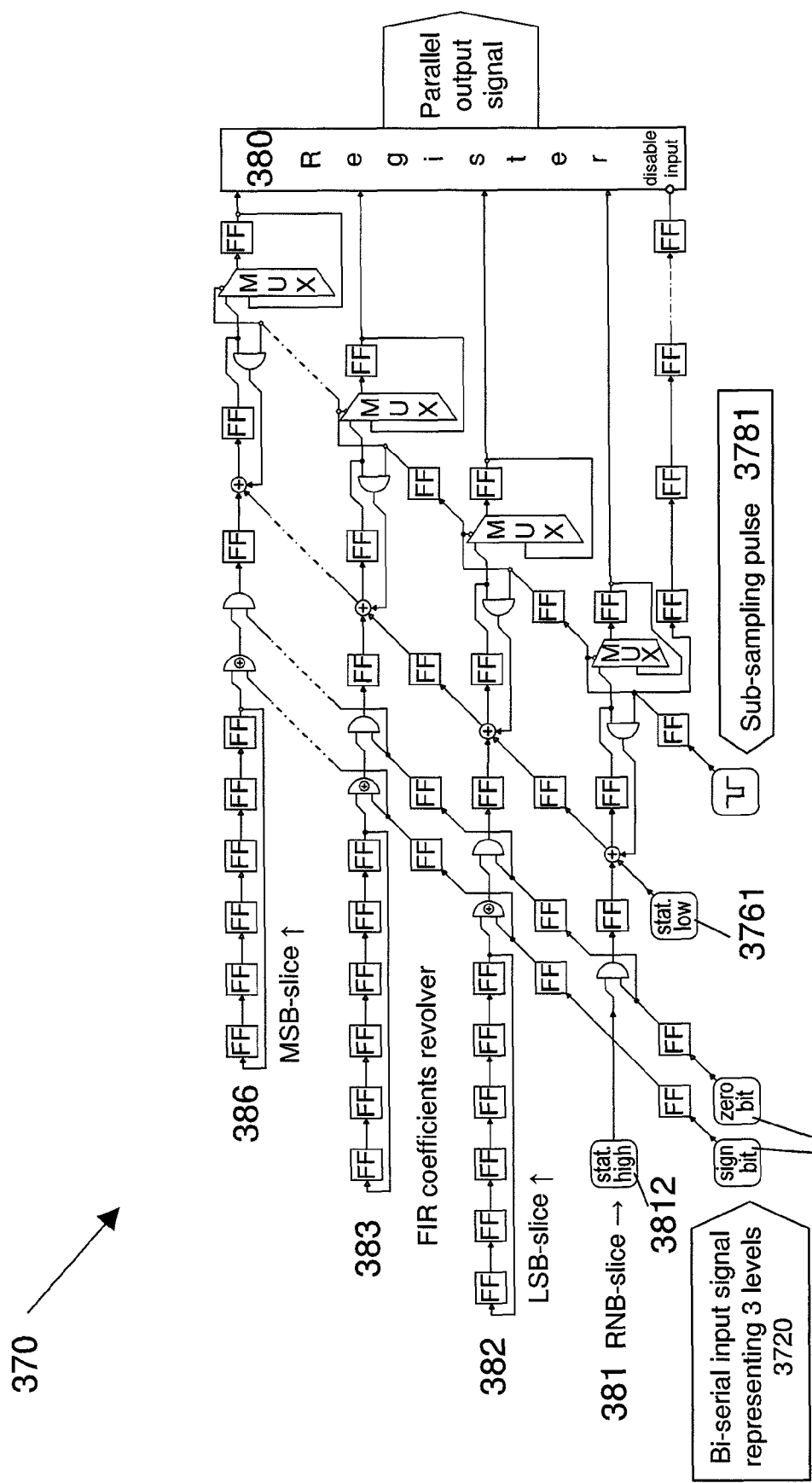
FIG. 13 shows a systolic DDC block realizing N:1 decimation of an 1.5 bit signal
Figure 14:
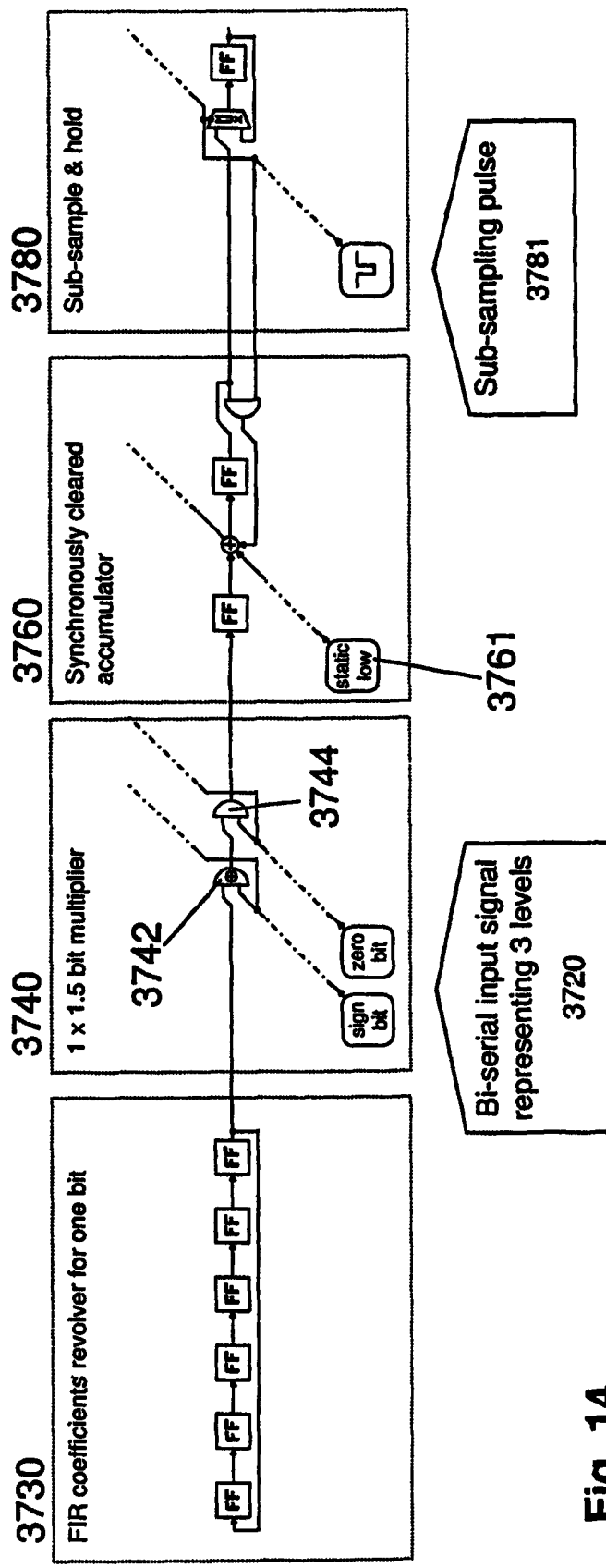
FIG. 14 shows a bit-slice of the convolution unit in a systolic DDC block for N:1 decimation.

FIG. 13 shows the systolic realisation of a DDC block 370 that can be an embodiment of DDC blocks 3701, 3702 up to 3706 of FIG. 12 for N=6. The systolic DDC block 370 realizes a 6:1 decimation of a 1.5 bit signal which represents 3 levels (+1, 0, −1) being coded by 2 bits per sample utilizing two's complement arithmetic. In this context, systolic realisation denotes a 2-dimensional pipelining in the flow direction of the coefficient bits (i.e. "horizontal pipelining") as well as in the flow direction of the carry bits (i.e. "vertical pipelining"). By definition, a "systolic array" comprises only binary logic elements like AND gates, EXOR gates and multiplexers plus one-bit full adders, flip-flops and wiring as depicted in FIGS. 13 and 14.

In two's complement arithmetic always utilized in every embodiment of the teachings disclosed herein, MSB denotes the Most Significant Bit representing the sign of a value A. A is negative when the MSB is set (high state) and positive when the MSB is cleared (low state). LSB denotes the Least Significant Bit representing in a codeword of n bits the value of $2^{-n}$ when the LSB is set (high state).

Furthermore a Representative Notation Bit (RNB) is included following the LSB. The RNB is always set (high state) representing the constant value of $2^{-(n+1)}$. This representative level notation achieved by introducing the RNB is used for enabling a systolic realization of the DDC block 370 because it inhibits the so called "carry ripple through effect". As known in the art, this effect normally occurs when in two's complement arithmetic a codeword is negated. When representative level notation by introducing a RNB is provided a given codeword for A can simply be negated by inverting all the bits from MSB to LSB whilst the RNB remains unchanged.

As depicted in FIG. 13, the systolic DDC Block 370 comprises a convolution plus sub-sampling unit composed of a plurality of L bit-slices 381, 382, 383 up to 386 followed by an output storage register 380 having a parallel output. Usually, L<N bit-slices are arranged in parallel but the teachings disclosed herein are not limited to the number of L<N bit-slices. All flip-flops FF shown in FIG. 13 and the output storage register 380 are clocked at the sampling rate of the bi-serial input signal 3720 representing 3 levels (+1, 0, −1).

The bit-slices 381, 382, 383 up to 386 jointly perform the convolution plus sub-sampling process by multiplying the bi-serial input signal 3720 sample wise by FIR filter coefficients of word length L (including the RNB) and accumulating the resulting products over N sampling clock pulses. The FIR filter coefficients for each of the bit-slices 382, 383 up to 386 are loaded bit wise into shift registers with feed-back termed 'FIR coefficients revolver' where the coefficient bits are rotated. Within the RNB-slice 381, however, the FIR coefficients revolver and a following EXOR gate are replaced by a static high signal 3812 because the RNB is always set as stated above.

The convolution plus sub-sampling process is running simultaneously in all of the bit-slices 381, 382, 383 up to 386 but mutually delayed due to a vertical pipelining caused by flip-flops FF in the direction from RNB via LSB to MSB. Therefore, the first part of the convolution result per sub-sampling cycle is obtained in the RNB-slice 381 whilst the last part of the convolution result per sub-sampling cycle is obtained L−1 clock pulses later in the MSB-slice 386. Thus, the result of a convolution plus sub-sampling cycle per bit-slice is intermediately stored in a sample & hold flip-flop equipped with feed-back via a multiplexer. This enables a permanently running convolution plus sub-sampling process within anyone of the bit-slices 381, 382, 383 up to 386 without the need to wait until the next bit-slices have finished.

As depicted in FIG. 13 for N=6, a convolution plus sub-sampling cycle is executed per bit-slice after N clock pulses when the sub-sampling pulse 3781 goes low. Finally, all of the intermediately per bit-slice stored results of a total convolution plus sub-sampling cycle calculated with delay by all of the bit-slices 381, 382, 383 up to 386 are taken over in parallel by the output storage register 380 after the MSB-slice 386 has finished its cycle of the convolution and sub-sampling process.

All of the bit-slices 381, 382, 383 up to 386 have the same elements to carry out their respective part of the convolution and sub-sampling process. Within the RNB-slice 381, however, the FIR coefficients revolver and the following EXOR gate are replaced by a static high signal 3812 because the RNB is always set as stated above.

FIG. 14 shows an example of one bit-slice 382, 383 up to 386 of the convolution plus sub-sampling unit within the systolic DDC block 370 in greater detail. As depicted for one bit level and N=6, a bit-slice of the convolution plus sub-sampling unit comprises 4 consecutive functional sub-units. A shift register equipped with feed-back termed 'FIR coefficients revolver' 3730 is loaded with bits of N coefficients being rotated within the FIR coefficients revolver 3730.

The bits of N coefficients are consecutively multiplied in the 1×1.5 bit multiplier unit 3740 by the samples of the bi-serial input signal 3720 representing 3 levels (+1, 0, −1) wherein the 'sign-bit' is set (high state) in case of negative input samples whilst the 'zero-bit' is set for non-zero input samples. The multiplication is simply executed by passing, inhibiting or inverting the coefficient bits using an EXOR gate 3742 and an AND gate 3744. The FIR filter coefficients usually are given in two's complement representative level notation including the RNB (as discussed above). Thus, inverting all of the bits of a given FIR filter coefficient from LSB to MSB performs the negation of the respective coefficient.

The results of these consecutive 1×1.5 bit multiplications are accumulated in a synchronously cleared accumulator 3760 until the sub-sampling pulse 3781 goes low. As depicted in FIG. 4a, the sub-sampling pulse 3781 is generated within the receive clock oscillator unit 237 utilizing a synchronous counter which derives the pulse 3781 from the receive clock signal, a method well known in the art.

The sub-sampling pulse 3781 is only in 1 out of N (in the example illustrated here: N=6) consecutive sampling intervals at low state causing at the rising edge of the next clock pulse the take-over of the content of the accumulator 3760 by the following sub-sample & hold stage 3780 whilst the accumulator 3760 is synchronously cleared and the next cycle of the convolution plus sub-sampling process is started immediately. In this arrangement, no extra clearing or read-out cycle is necessary, thus keeping the convolution plus sub-sampling and read-out process straight forward and strictly synchronous.

It should be noted that the RNB of the coefficients being always set is also included in the convolution plus sub-sampling process. This is done by a special RNB-slice 381 wherein the coefficients revolver and the following EXOR gate are replaced by a static high signal 3812.

While various embodiments of the disclosed antenna system and computer-program product have been described above, it should be understood that they have been presented by way of example, and not limitation. It will be apparent to persons skilled in the relevant arts that various changes in form and detail can be made therein without departing from the scope of what is taught. In addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modelling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the disclosed antenna system may include methods of providing the apparatus described herein by providing software describing the apparatus and subsequently transmitting the software as a computer data signal over a communication network including the Internet and intranets.

It is understood that the antenna system described herein may be included in a semiconductor intellectual property core, such as a microprocessor core (e.g., embodied in HDL) and transformed to hardware in the production of integrated circuits. Additionally, antenna system described herein may be embodied as a combination of hardware and software. Thus, what is taught should not be limited by any of the above-described exemplary embodiments, but should be defined only in accordance with the following claims and their equivalents.

The invention claimed is:

1. An antenna system connectable to a base station, the antenna system comprising:
   a plurality of antenna elements forming an antenna for transceiving multi-frequency carrier signals;
   a digital radio unit connected to at least one of the plurality of antenna elements, wherein the digital radio unit comprises:
   a plurality of digital micro radios for receiving and sending digital radio signals, wherein each of the plurality of digital micro radios is connected to a respective one of the plurality of antenna elements, each of the digital micro radios having a digital down-converter and a digital up-converter and a digital signal converter; whereby each of the plurality of micro radios converts the digital radio signals to analogue RF (radio frequency) signals and vice versa; and
   a plurality of hubs for processing digital radio signals and control signals and for routing said digital radio signals and control signals via a plurality of digital links and a plurality of interfaces, a respective one of the plurality of digital links being provided between a respective one of the plurality of hubs and a respective one of the plurality of micro radios,
   wherein each of the plurality of hubs comprises a frequency multiplexer and demultiplexer unit for up and down-converting base band signals to and from subcarrier frequencies;
   a sample rate converter for adjusting sampling frequency of the frequency multiplexer and demultiplexer.

2. The antenna system according to claim 1, wherein at least one of the plurality of micro radios is operable in frequency division duplex (FDD) mode and comprises:
   a FDD filter unit connected at a receive output to an input of a low noise analogue-to-digital converter and further connected at a transmit input to an output of a power digital-to-analogue converter;
   a digital transceiver connected at an output for signal to an input of the power digital-to-analogue converter and further connected at an input for signal to an output of the analogue-to-digital converter, the digital transceiver having a receive section and a transmit section, the digital up-converter being part of the transmit section and the digital down-converter being part of the receive section;
   a receive clock oscillator unit for providing a sampling clock for the analogue-to-digital converter and for the receive section of the digital transceiver and for further providing a sub-sampling pulse for said receive section;
   a transmit clock oscillator unit for providing a sampling clock for the power digital-to-analogue converter and for the transmit section of the digital transceiver.

3. The antenna system according to claim 2, wherein the analogue-to-digital converter comprises a low noise amplifier followed by a continuous-time sigma-delta band-pass modulator converting the RF signal at the input directly into a digital single/1.5 bit band-pass output signal.

4. The antenna system according to claim 2, wherein the power digital-to-analogue converter utilizes 2 or 3 voltage levels to convert a digital single/1.5 bit band-pass input signal directly into an analogue RF output signal.

5. The antenna system according to claim 1, wherein at least one of the plurality of micro radios is operable in time division duplex (TDD) mode and comprises:
   a TDD filter unit followed by a TDD switch connected at a receive output to an input of a analogue-to-digital converter and further connected at a transmit input to an output of a power digital-to-analogue converter;
   a digital transceiver connected at an output for signal to an input of the power digital-to-analogue converter and further connected at an input for signal to an output of the analogue-to-digital converter, the digital transceiver having a receive section and a transmit section, the digital up-converter being part of the transmit section and the digital down-converter being part of the receive section;
   at least one clock oscillator unit for providing a sampling clock for the analogue-to-digital converter, the power digital-to-analogue converter, and the digital transceiver and for further providing a sub-sampling pulse for the receive section of the digital transceiver and a time control signal for the TDD switch.

6. The antenna system according to claim 5, wherein the analogue-to-digital converter comprises a low noise amplifier followed by a continuous-time sigma-delta band-pass modulator converting the RF signal at the input directly into a digital single/1.5 bit band-pass output signal.

7. The antenna system according to claim 2, wherein the power digital-to-analogue converter utilizes 2 or 3 voltage levels to convert a digital single/1.5 bit band-pass input signal directly into an analogue RF output signal.

8. The antenna system according to claim 1, wherein the digital up-converter utilizes a unit performing quadrature modulation by 2:1 multiplexing and cyclic negation in combination with a time-discrete sigma-delta band-pass modulator or two time-discrete sigma-delta low-pass modulators to output a digital single/1.5 bit band-pass signal being directly up-converted from a digital base-band signal; and wherein the digital down-converter utilizes a unit performing quadrature demodulation by 1:2 de-multiplexing and cyclic negation followed by two systolic FIR decimators to down-convert the digital single/1.5 bit band-pass input signal directly into a digital base-band signal.

9. The antenna system according to claim 8, wherein the time-discrete sigma-delta band-pass modulator is realized as a systolic array.

10. The antenna system according to claim 8, wherein the two time-discrete sigma-delta low-pass modulators are realized as systolic arrays.

11. The antenna system according to claim 1, wherein digital base-band signals are processed by at least one of the plurality of hubs within time and frequency domain.

12. The antenna system according to claim 1, wherein at least one micro controller and at least one control bus are embedded in at least one of the plurality of hubs; and
   whereby processing and routing of digital base-band signals and control signals by the at least one of the plurality of hubs is controlled and monitored by said micro controller.

13. The antenna system according to claim 1, wherein the frequency multiplexer and demultiplexer unit comprise:
   at least one digital quadrature modulator for combining a plurality of digital base-band signals to a digital multi-carrier signal;
   at least one digital quadrature demodulator for splitting a digital multi-carrier signal into a plurality of digital base-band signals.

14. The antenna system according to claim 1, wherein the sampling rate utilizes a variable over-sampling ratio.

15. The antenna system according to claim 1, wherein at least one of the plurality of hubs comprises at least one Amplitude & Phase Aligner unit comprising at least one complex digital multiplier stage for adjusting amplitude and phase of digital band-pass signals and within at least one of the plurality of micro radios under software control.

16. The antenna system according to claim 1, wherein at least one of the plurality of hubs comprises at least one Time Multiplexer & DeMultiplexer and Hub unit for handling the routing of incoming and outgoing data streams via at least one Serializer/Deserializer (SerDes) interface unit under software control.

17. The antenna system according to claim 1, wherein at least one of the plurality of hubs comprises at least one Master Clock Oscillator unit being synchronized to the time reference of the Digital Radio Server by the at least one Master Serpes interface unit for providing clock signals for all units of the at least one of the plurality of hubs and for synchronizing the clock units of the at least one of the plurality of micro radios.

18. The antenna system according to claim 1, wherein at least one serial link between at least one of the plurality of hubs and at least one of the plurality of micro radios is a digital bi-directionally serial link transporting digital base-band signals and adjacent control information as packet data in a partially filled frame format, wherein an adjustment of frame length and format and further the number of samples per frame is software controllable.

19. The antenna system according to claim 2, wherein the at least one of the plurality of micro radios further comprises an additional power amplifier being inserted between an output of the power digital-to-analogue converter and a receive input of the FDD filter unit or a TDD switch.

20. The antenna system according to claim 2, wherein the at least one of the plurality of micro radios utilizes a sampling rate of digital band-pass signals and being 4 times or 4/3 times a RF carrier frequency.

21. The antenna system according to claim 2, wherein the at least one of the plurality of micro radios utilizes a multi-bit format of digital band-pass signals.

22. The antenna system according to claim 2, wherein at least one of the functional sub-units analogue-to-digital converter, power digital-to-analogue converter, transmit clock oscillator unit, receive clock oscillator unit, and digital transceiver of the at least one micro radio are monolithically integrated by micro-electronic means.

23. The antenna system according to claim 2, wherein the at least one of the plurality of micro radios is monolithically integrated by micro-electronic means or as a multi-chip module.

24. The antenna system according to claim 1, wherein the digital radio unit is monolithically integrated by micro-electronic means or as a multi-chip module.

25. The antenna system according to claim 1, wherein at least one of the plurality of micro radios is proximately connected to one or two antenna elements.

26. The antenna system according to claim 1, wherein the digital radio unit comprises a plurality of micro radios each being proximately connected to one or two antenna elements.

27. The antenna system according to claim 26, wherein the digital radio unit further comprises at least one micro sniffer being proximately connected to at least one monitoring antenna, the micro sniffer being useable for antenna calibration.

28. The antenna system according to claim 1, wherein the digital radio unit is connected to a digital radio server by at least one optical fiber.

29. The antenna system according to claim 1, whereby said processing and routing of digital radio signals and control signals performed by at least one of the plurality of hubs is software controllable.

30. The use of an antenna system according to claim 1 within a mobile communications network.

* * * * *

UNITED STATES PATENT AND TRADEMARK OFFICE
CERTIFICATE OF CORRECTION

PATENT NO. : 8,711,903 B2
APPLICATION NO. : 12/339239
DATED : April 29, 2014
INVENTOR(S) : Clemens Rheinfelder et al.

It is certified that error appears in the above-identified patent and that said Letters Patent is hereby corrected as shown below:

In the Claims:

Column 21, Line 5, "Multiplexer & DeMultiplexer"
should read -- Multiplexer & De-Multiplexer --;

Column 21, Line 13, "Serpes" should read -- SerDes --.

Signed and Sealed this
Fifteenth Day of July, 2014

Michelle K. Lee
*Deputy Director of the United States Patent and Trademark Office*